US009178992B2

(12) United States Patent
Appelman et al.

(10) Patent No.: US 9,178,992 B2
(45) Date of Patent: *Nov. 3, 2015

(54) USER INTERFACE FOR SELECTING AUDIO IDENTIFIERS FOR DIGITAL COMMUNICATIONS

(75) Inventors: Barry Appelman, McLean, VA (US); Stephen Vaughan Murphy, Halifax (CA)

(73) Assignee: FACEBOOK, INC., Menlo Park, CA (US)

(*) Notice: Subject to any disclaimer, the term of this patent is extended or adjusted under 35 U.S.C. 154(b) by 288 days.

This patent is subject to a terminal disclaimer.

(21) Appl. No.: 13/620,283

(22) Filed: Sep. 14, 2012

(65) Prior Publication Data
US 2013/0070916 A1 Mar. 21, 2013

Related U.S. Application Data

(63) Continuation of application No. 12/651,789, filed on Jan. 4, 2010, which is a continuation of application No. 10/747,694, filed on Dec. 30, 2003, now Pat. No. 7,644,166.

(60) Provisional application No. 60/474,207, filed on May 30, 2003, provisional application No. 60/450,696, filed on Mar. 3, 2003.

(51) Int. Cl.
*H04M 3/533* (2006.01)
*H04M 3/42* (2006.01)
(Continued)

(52) U.S. Cl.
CPC .......... *H04M 3/42017* (2013.01); *G06Q 10/107* (2013.01); *H04L 12/587* (2013.01); *H04L 51/24* (2013.01); *H04M 3/02* (2013.01); *H04M 3/42042* (2013.01); *H04M 3/4211* (2013.01);
(Continued)

(58) Field of Classification Search
CPC .................................................. H04M 3/53383
USPC ........................................................ 379/93.01
See application file for complete search history.

(56) References Cited

U.S. PATENT DOCUMENTS 6,094,587 A  7/2000 Armanto et al.
6,449,359 B1 9/2002 Luzzatto et al.
(Continued)

FOREIGN PATENT DOCUMENTS

WO      0122258    3/2001
WO   2004079929   9/2004

OTHER PUBLICATIONS

U.S. Appl. No. 13/185,917, Apr. 29, 2013, Notice of Allowance.
(Continued)

*Primary Examiner* — Amal Zenati
(74) *Attorney, Agent, or Firm* — Keller Jolley Preece

(57) ABSTRACT

Audibly informing a recipient of an arrival of a digital communication from a sender includes receiving a digital communication from a sender directed to a recipient and determining whether the digital communication is associated with an audio identifier that identifies the sender of the digital communication and that is designated by the sender of the digital communication. Perception by the recipient of the audio identifier is conditioned on whether the digital communication is determined to be associated with the audio identifier. The audio identifier is perceived prior to or concurrent with perception of the digital communication by the recipient.

19 Claims, 18 Drawing Sheets

(51) Int. Cl.
*G06Q 10/10* (2012.01)
*H04L 12/58* (2006.01)
*H04M 3/02* (2006.01)
*H04M 3/436* (2006.01)

(52) U.S. Cl.
CPC .......... *H04M 3/42365* (2013.01); *H04M 3/436* (2013.01); *H04M 3/533* (2013.01); *H04M 3/53383* (2013.01); *H04M 2203/2011* (2013.01); *H04M 2203/6009* (2013.01)

(56) References Cited

U.S. PATENT DOCUMENTS

| | | | |
|---|---|---|---|
| 6,501,967 | B1 | 12/2002 | Mäkelä et al. |
| 6,532,477 | B1 | 3/2003 | Tang et al. |
| 6,570,983 | B1 | 5/2003 | Speeney et al. |
| 6,711,402 | B1 | 3/2004 | Chelliah et al. |
| 6,760,754 | B1 | 7/2004 | Isaacs et al. |
| 6,970,543 | B2 | 11/2005 | Lautenschlager et al. |
| 7,099,457 | B2 | 8/2006 | Weiner |
| 7,280,647 | B2 | 10/2007 | Henderson |
| 7,382,233 | B2 | 6/2008 | Steinetz et al. |
| 7,436,949 | B2 | 10/2008 | Weiner |
| 7,496,352 | B2 | 2/2009 | Kaminsky et al. |
| 7,644,166 | B2 | 1/2010 | Appelman et al. |
| 7,672,439 | B2 | 3/2010 | Appelman et al. |
| 7,693,944 | B2 | 4/2010 | Appelman et al. |
| 7,778,664 | B1 | 8/2010 | Fujisaki |
| 7,924,996 | B2 | 4/2011 | Appelman et al. |
| 7,987,236 | B2 | 7/2011 | Appelman et al. |
| 2002/0034281 | A1 | 3/2002 | Issacs et al. |
| 2002/0073207 | A1 | 6/2002 | Widger et al. |
| 2002/0085701 | A1 | 7/2002 | Parsons et al. |
| 2002/0130904 | A1 | 9/2002 | Becker et al. |
| 2003/0033214 | A1* | 2/2003 | Mikkelsen et al. ............. 705/26 |
| 2003/0073434 | A1* | 4/2003 | Shostak ........................ 455/426 |
| 2004/0001518 | A1 | 1/2004 | Gilbert et al. |
| 2004/0024822 | A1 | 2/2004 | Werndorfer et al. |
| 2006/0029202 | A1 | 2/2006 | Koskela |
| 2009/0161844 | A1 | 6/2009 | Bachenberg |
| 2010/0104080 | A1 | 4/2010 | Appelman et al. |
| 2012/0020467 | A1 | 1/2012 | Appelman et al. |
| 2013/0073655 | A1 | 3/2013 | Appelman et al. |

OTHER PUBLICATIONS

U.S. Appl. No. 13/620,561, Feb. 15, 2013, Office Action.
Isaacs, Ellen, "Example UI Spec: Sound Instant Messages", Internet Document: http://www.uidesigns.comispeckl-sims.html, Jun. 26, 2003, pp. 1-2.
Handspring, "Ring Tones on the Treo 300", Application Note AN-26, Revision 0.90, pp. 1-5.
Twist, Jo, "Mobile Tones Ring in the Changes", BBC News Online Technology Reporter, Internet Document: http://news.bbc.co.uk/1/hi/technology/3239928.stm, Feb. 3, 2004; pp. 1-4.
"Ringtonia.com The Latest Buzz on Ringtones", Internet Document: http://www.textually.org/ringtonia/archives/cat_ringback_tones.htm, Feb. 3, 2004, pp. 1-9.
ICQ: "ICQ 99a, Online Help", Announcement ICQ, XX, XX, 1998, XP002163918, pp. 1-6.
Notification of Transmittal of the International Search Report and the Written Opinion of the International Searching Authority, or the Declaration, PCT/US2004/006334, dated Feb. 22, 2005.
U.S. Appl. No. 10/747,694, Jul. 8, 2008, Office Action.
U.S. Appl. No. 10/747,694, Jan. 15, 2009, Office Action.
U.S. Appl. No. 10/747,694, Aug. 24, 2009, Notice of Allowance.
U.S. Appl. No. 10/747,699, Jun. 24, 2008, Office Action.
U.S. Appl. No. 10/747,699, Jan. 7, 2009, Office Action.
U.S. Appl. No. 10/747,699, May 19, 2009, Office Action.
U.S. Appl. No. 10/747,699, Oct. 8, 2009, Notice of Allowance.
U.S. Appl. No. 10/864,393, Sep. 12, 2008, Office Action.
U.S. Appl. No. 10/864,393, Mar. 19, 2009, Office Action.
U.S. Appl. No. 10/864,393, Jul. 8, 2009, Office Action.
U.S. Appl. No. 10/864,393, Nov. 20, 2009, Notice of Allowance.
U.S. Appl. No. 12/651,789, Jun. 28, 2012, Office Action.
U.S. Appl. No. 12/651,789, Mar. 15, 2013, Notice of Allowance.
U.S. Appl. No. 12/651,789, Jul. 19, 2013, Notice of Allowance.
U.S. Appl. No. 12/713,254, Jun. 25, 2010, Office Action.
U.S. Appl. No. 12/713,254, Dec. 13, 2010, Notice of Allowance.
U.S. Appl. No. 12/721,809, Sep. 29, 2010, Office Action.
U.S. Appl. No. 12/721,809, Mar. 23, 2011, Notice of Allowance.
U.S. Appl. No. 13/185,917, Feb. 19, 2013, Notice of Allowance.

* cited by examiner

| Somber Funeral March | Sound of Rooster | High-pitched Bell Sound |
|---|---|---|

USER INTERFACE FOR SELECTING AUDIO IDENTIFIERS FOR DIGITAL COMMUNICATIONS

CROSS REFERENCE TO RELATED APPLICATIONS

The present application is a continuation of U.S. application Ser. No. 12/651,789, filed Jan. 4, 2010, which is a continuation of U.S. application Ser. No. 10/747,694, filed Dec. 30, 2003, which is now issued as U.S. Pat. No. 7,644,166, which claims the benefit of and priority to U.S. provisional application No. 60/474,207, filed May 30, 2003, and U.S. provisional application No. 60/450,696, filed Mar. 3, 2003. Each of the aforementioned patent(s) and application(s) are hereby incorporated by reference in their entirety.

TECHNICAL FIELD

This invention relates to communications systems which enable exchange of information between users through a call or through transmission of a digital communication.

BACKGROUND

Typical telephones generate an audible ringing tone to indicate an incoming call. Some telephones allow the recipient to tailor the ringing tone to a given caller and thereby enable the recipient to become aware of both the incoming call and the identity of the caller when hearing the ringing tone.

Similarly, many computer systems used for the exchange of digital communications (e.g., instant messages or e-mails) allow a recipient to select that a message sound be played upon receipt of a digital communication. The message sound may be played every time a digital communication is received, irrespective of the identity of the sender.

Both the ringing tone and the message sound provide the benefit of informing the recipient of the incoming call or received digital communication without requiring the recipient to look at a screen or a display.

SUMMARY

In one general aspect, audibly informing a recipient of an arrival of a digital communication from a sender includes receiving a digital communication from a sender directed to a recipient and determining whether the digital communication is associated with an audio identifier that identifies the sender of the digital communication and that is designated by the sender of the digital communication. Perception by the recipient of the audio identifier is conditioned on whether the digital communication is determined to be associated with the audio identifier. The audio identifier is perceived prior to or concurrent with perception of the digital communication by the recipient.

Implementations may include one or more of the following features. For example, the digital communication may be an instant message, e-mail, or voice mail. The audio identifier may be a spoken version of a user identifier of the sender.

Determining whether the digital communication is associated with an audio identifier may include determining whether an audio identifier has been received from the sender or received from the sender with the digital communication. Determining whether the digital communication is associated with an audio identifier may include accessing a data store based on a user identifier of the sender that may be included in the digital communication. The user identifier may be an e-mail address, an instant messaging handle, or a screen name.

The recipient perception of the audio identifier also may be conditioned on whether the recipient is available to receive the digital communication. If the recipient is not available to receive the digital communication, the digital communication may be discarded or may be deposited in a data store for later retrieval.

The recipient perception of the audio identifier also may be conditioned on whether communication exchange preferences associated with the recipient allow the recipient to perceive the audio identifier. The recipient may be allowed to perceive the audio identifier and/or the digital communication when the communication exchange preferences explicitly include a setting indicating that the recipient is allowed to perceive the audio identifier. The recipient may not be allowed to perceive the audio identifier and/or the digital communication when the communication exchange preferences explicitly include a setting indicating that the recipient is not allowed to perceive the audio identifier. The settings may be set by the recipient in response to a query.

Audibly informing a recipient of an arrival of a digital communication may further include enabling the recipient to perceive a sender profile or to perceive a user interface and allowing the recipient to perceive the audio identifier if the recipient selects a user interface element that corresponds to authorization of the audio identifier.

The digital communication may be a phone call and the sender may be a caller. Receiving a digital communication may include receiving a phone call directed to the recipient. Determining whether the digital communication is associated with an audio identifier may include determining whether the phone call is associated with an audio identifier that identifies the caller and that is designated by the caller. Perception of the audio identifier by a recipient may be conditioned on whether the phone call is determined to be associated with the audio identifier. The audio identifier may be perceived as a ring tone for the phone call. Enabling the recipient to perceive the audio identifier may include playing the audio identifier multiple times in repetition to serve as a ring tone for the phone call.

In another general aspect, a user interface for enabling a recipient of a digital communication from a sender to authorize or reject a source audio identifier may include a first interface element, a second interface element, and a third interface element. The first interface element is structured and arranged to provide notification of a digital communication that has been received. The second interface element is structured and arranged to provide notification of an audio identifier that identifies the sender of the digital communication and that is designated by the sender of the digital communication. The third interface element is structured and arranged to enable the recipient of the digital communication to authorize or reject presentation of the audio identifier in advance of audio identifier presentation.

Implementations may include one or more of the following features. For example, the first interface element may display sender profile information. The third interface element may be additionally structured and arranged to enable the recipient of the digital communication to authorize or reject presentation of the digital communication.

The third interface element may include a set of fourth interface elements selectable by the recipient to effect authorization or rejection of the audio identifier presentation. The set of fourth interface elements may include an interface element selectable to authorize presentation of the digital communication and the audio identifier, to authorize presentation of the digital communication but reject presentation of the audio identifier, and to authorize presentation of the digital communication and authorize presentation of an audio identifier for the sender that reveals the sender identity but that obscures the sender designated audio identifier.

The set of fourth interface elements may include an interface element selectable to deposit the digital communication in a data store for later retrieval by the recipient, an interface element to authorize or reject presentation of an audio identifier upon receipt of each future digital communication from the sender, and an interface element selectable to authorize or reject presentation of the audio identifier upon receipt of each future digital communication from the sender conditioned on whether the audio identifier is subsequently changed by the recipient.

The digital communication may be a phone call and the sender may be a caller and the first interface element may be structured and arranged to provide notification of a phone call from a caller. The second interface element may be structured and arranged to provide notification of an audio identifier that identifies the caller and that is designated by the caller. The third interface element may be structured and arranged to enable the recipient of the phone call to authorize or reject presentation of the audio identifier in advance of audio identifier presentation.

In another general aspect, a computer system for audibly informing a recipient of an arrival of a digital communication from a sender includes a data store and a digital communication processor. The data store stores audio identifiers. The digital communication processor receives a digital communication from a sender directed to a recipient and determines whether the digital communication is associated with an audio identifier that identifies the sender of the digital communication and that is designated by the sender of the digital communication. The digital communication processor accesses the audio identifier from the data store and conditions perception by the recipient of the audio identifier on whether the digital communication is determined to be associated with the audio identifier. The audio identifier is perceived by the recipient prior to or concurrent with perception of the digital communication by the recipient.

In another general aspect, informing a recipient of an arrival of a digital communication from a sender includes receiving a digital communication from a sender directed to a recipient and determining whether the digital communication is associated with an identifier that identifies the sender of the digital communication and that is designated by the sender of the digital communication. Perception of the digital communication by the recipient is conditioned on whether the digital communication is determined to be associated with the identifier. The identifier is perceived by the recipient prior to or concurrent with perception of the digital communication by the recipient.

Implementations may include one or more of the following features. For example, the identifier may be a video image designated by the sender or an audio visual presentation designated by the sender.

The details of one or more implementations are set forth in the accompanying drawings and the description below. Other features will be apparent from the description and drawings, and from the claims.

DETAILED DESCRIPTION

Figure 1:
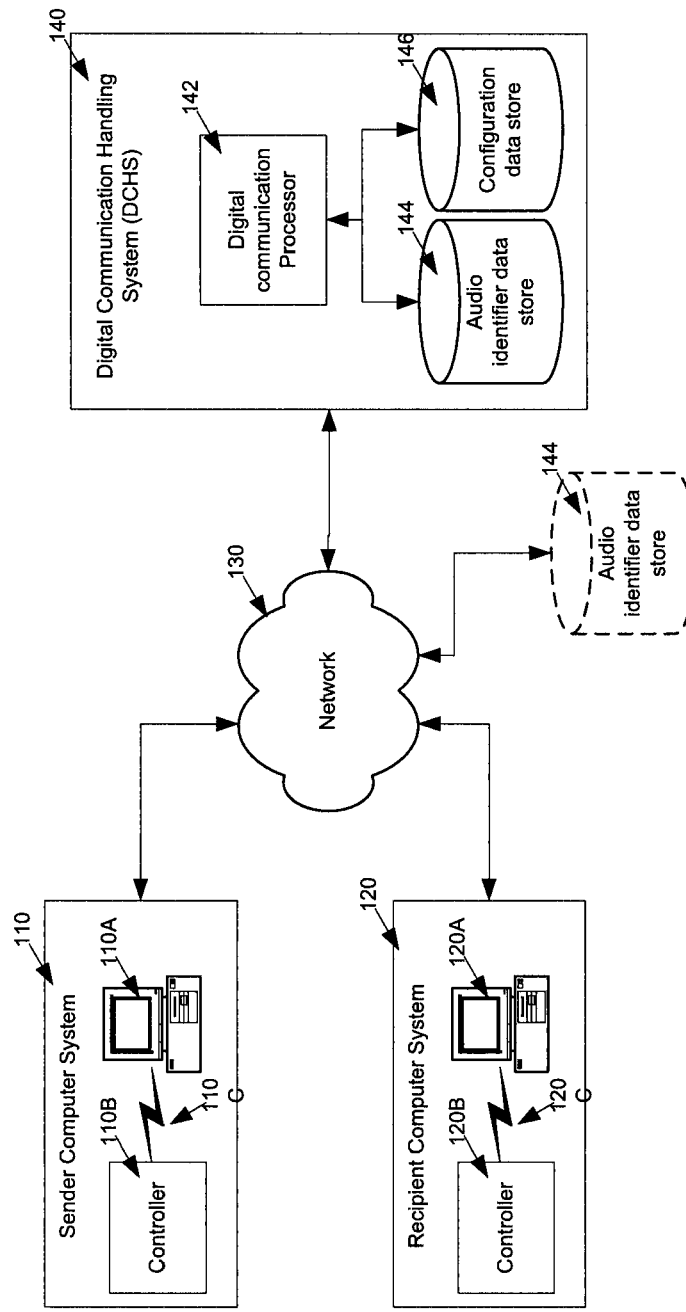
FIG. 1 is a block diagram illustrating a system for enabling the exchange of digital communications with source audio identifiers.

Callers or senders of digital communications may push source audio identifiers to recipients in order to customize or personalize communication exchanges with the recipients. The caller or sender may select a source audio identifier, making source audio identifiers accessible to a call recipient phone or recipient computer system. The call recipient phone or recipient computer system enables the recipient to authorize or reject the source audio identifier. If the recipient authorizes the source audio identifier, the call recipient phone or recipient computer system plays the source audio identifier each time the caller calls the recipient or each time the sender sends a digital communication to the recipient.

A source audio identifier typically is stored in a digital file containing audio data that is used to identify the sender or caller. The source audio identifier may be, for example, a data file encoded using MPEG Layer III Audio (MP3) and may range from 120 kilobits in size to 2 megabits in size. A typical source audio identifier, when converted to audio (i.e., "played"), may produce 1-2 seconds of sound. For example, a source audio identifier may be the spoken version of a sender's user identifier (e.g., a spoken version of the sender's instant messaging handle, e-mail address, or screen name, in the voice of the sender). The source audio identifier also may be any arbitrary sound that the sender designates as indicative of the identity of the sender (e.g., a barnyard animal sound, a sound from a popular television show, a sound effect, and a sound related to human biological functions or behaviors).

The source audio identifier performs two functions when played: (1) the source audio identifier informs the recipient of an incoming call from the caller or, additionally or alternatively, informs the recipient of receipt of a digital communication from the sender; and (2) the source audio identifier indicates, to a recipient, the identity, category or characteristic of the source of the digital communication. Accordingly, the source audio identifier is a signaling mechanism and, therefore, is logically independent from the content of the call or the content of digital communications exchanged between the sender and the recipient.

The source audio identifier may be a single sound that identifies the sender or, alternatively, may be a combined audio message formed from multiple sounds that are, for example, concatenated or blended together to identify not only the sender but also one or more characteristics of the sender or of the communication sent by the sender. The combined audio message may include one or more identity sounds and one or more characteristic sounds, or it may be exclusive of either. The identity sounds identify the individual sender while the characteristic sounds describe, qualify, or characterize the sender or the communication sent by the sender. For example, an identity sound may be a spoken screen name, the sound of a monkey specified by the sender, or a recipient-designated sound associated with a group or category of contacts or a contact characteristic to indicate the identity of the sender, and a characteristic sound may be a high-pitched alarm sound to indicate that the communication is designated by the sender as a high priority communication. As more sounds are concatenated, the call recipient may be provided with increasing levels of information regarding the communication and its source.

More particularly, in one implementation, the concatenated audio message may include one or more recipient-specified sounds. For example, the recipient may specify a characteristic sound for that sender that indicates that the sender is a member of the buddy list of the recipient, or of a particular buddy group within the buddy list. When receiving a communication from that sender, the recipient may, for example, hear a sound indicating that the sender is a member of the recipient's buddy list, followed by a different sound indicating a buddy group for the sender, followed by an audio identifier specified by the sender. In this example, the recipient is made aware of both the sender identity and of their relationship to the recipient on several levels.

Concatenated audio messages may be used in communications systems that do not support sender-specified sounds. In this implementation, the sounds in the concatenated audio messages may be specified by the recipient or may be more globally defined. The concatenated audio message still performs the functions of identifying that a communication or call has been received, identifying the identity of the sender, and, if applicable, identifying characteristics of the sender or of the communication sent by the sender.

Concatenated audio messages may be used to audibly inform a user of communication-related events that are not related to receipt of a communication or call. For example, concatenated audio messages may be used in an instant messaging context to audibly inform a user of presence state changes of a member of the buddy list of the user.

Referring to FIG. 1, a system 100 for enabling the exchange of digital communications with source audio identifiers includes a sender computer system 110 that sends a digital communication to a digital communication handling system (DCHS) 140 through a network 130. The DCHS 140 identifies a source audio identifier associated with the sender to the digital communication and enables a recipient computer system 120 to access the digital communication and the source audio identifier through the network 130. The recipient computer system 120 accesses or otherwise receives the digital communication and the source audio identifier and enables a recipient to perceive the source audio identifier prior to or concurrent to enabling the recipient to perceive the digital communication.

A digital communication typically includes a digital file such as, for example, an electronic mail (e-mail), an instant message (IM), a voicemail, having audio data, video data, general binary data, or text data (e.g., encoded in American Standard Code for Information Interchange (ASCII) format). A digital communication is associated with a sender user identifier and a recipient user identifier. The sender and recipient user identifiers are data tags or labels used to identify the sender and the recipient, respectively, and may be, for example, e-mail addresses, instant messaging handles, Internet Protocol addresses, screen names, and/or phone numbers.

The sender computer system 110 is configured to send a digital communication to the DCHS 140 through the network 130. The sender computer system 110 typically includes a device 110A capable of executing instructions under the command of a controller 110B. The device 110A may be a general purpose computer such as a workstation or personal computer or may be a special purpose computer such as a portable digital assistant (PDA), a landline phone with digital processing capabilities, or a mobile phone with digital processing capabilities. The controller 124 may command and direct communications between the device 110A of the sender computer system 110 and the DCHS 140. The controller 110B may be a digital communications interface application that enables transmission of digital communications to the DCHS 140 using a communications protocol. For example, in an e-mail-oriented implementation, the digital communications interface application may be an e-mail application and the communications protocol may be, for example, Simple Mail Transfer Protocol (SMTP). The device 110A may be connected to the controller 110B by a wired or wireless data pathway 110C capable of delivering data.

In another implementation, the sender computer system 110 is configured to send both a digital communication and a source audio identifier to the DCHS 140. In this implementation, the DCHS 140 does not access and send a source audio identifier, but rather, relays the received source audio identifier and the received digital communication to the recipient computer system 120. The source audio identifier also may be stored by the recipient computer system 120 rather than by the DCHS 140 or by the sender computer system 110.

In yet another implementation, the sender computer system 110 is additionally configured to send to the DCHS 140 a user profile corresponding to the sender (i.e., a sender profile). The DCHS 140, in turn, may enable access to all or portions of the sender profile to the recipient computer system 120. The sender profile may include sender identity information and other information related to the sender such as, for example, interests, hobbies, marital status, location, occupation, gender, a personal quote, and favorite gadgets. The sender identity information may include any type of identifier (e.g., text or video) that may be used to identify the sender to the recipient. For example, the sender identity information may include a video image associated with the sender such as a picture of the sender.

The sender computer system 110 may send the source audio identifier and/or the sender profile each time a digital communication is sent to the recipient computer system 120 or, alternatively, may send the source audio identifier and/or the sender profile only at the beginning of a communication session with the recipient computer system 120. The following description is directed primarily to the communication and perception of the source audio identifier, but described concepts and configurations may also apply to the other aspects of a sender profile.

The recipient computer system 120 is configured to access and enable a recipient to perceive a digital communication and a source audio identifier. The recipient computer system 120 receives or otherwise accesses the digital communication and the source audio identifier from the DCHS 140 through the network 130. In another implementation, the recipient computer system 120 also receives or otherwise accesses all or a portion of the sender profile from the DCHS 140. The recipient computer system 120 typically includes a device 120A capable of executing instructions under the command of a controller 120B. The device 120A may be a general purpose computer such as a workstation or personal computer or may be a special purpose computer such as a portable digital assistant (PDA), a landline phone with digital processing capabilities, or a mobile phone with digital processing capabilities. The controller 124 may command and direct communications between the device 120A of the recipient computer system 120 and the DCHS 140. The controller 120B may be a digital communications interface application that enables receipt of digital communications from DCHS 140 using a communications protocol. In an e-mail-oriented implementation, the digital communications interface application may be an e-mail application and the communications protocol may be, for example, Post Office Protocol (POP) or Internet Message Access Protocol (IMAP). The device 120A may be connected to the controller 120B by a wired or wireless data pathway 120C capable of delivering data.

The device 120A typically includes a data store that may be used for storing source audio identifiers and/or sender profiles associated with senders with whom a communication session is ongoing or with whom a communication session has already taken place. The device 120A may store a source audio identifier and/or a sender profile at the beginning of a communication session and access the stored source audio identifier as necessary throughout the communication session in accordance with user communication exchange preferences. The device 120A also may include a repository of source audio identifiers and/or sender profiles from previous communication sessions. The user communication exchange preferences also may be stored in the device 120A.

The network 130 is configured to enable direct or indirect communications between the sender computer system 110, the recipient computer system 120, and the DCHS 140. Examples of the network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

The DCHS 140 includes a digital communication processor 142, an audio identifier data store 144, and a configuration data store 146. The digital communication processor 142 is a computer system configured to receive a digital communication from the sender computer system 110 and determine whether to discard the digital communication, deposit the digital communication in a data store for subsequent retrieval by the recipient computer system 120, or send the digital communication to the recipient computer system 120. The digital communication processor 142 may send the digital communication to the recipient computer system 120 with or without an attached source audio identifier.

The digital communication processor 142 may access the configuration data store 146 to retrieve the sender profile and may send the sender profile (or aspects thereof) to the recipient computer system 120 along with the digital communication. The digital communication processor 142 also may access the configuration data store 146 to retrieve user communication exchange preferences associated with the potential recipient of the digital communication.

The user communication exchange preferences include one or more lists of user identifiers that may be accessed by the digital communication processor 142 when processing the digital communications. The lists may include a list of user identifiers from which digital communications will not be authorized (i.e., a black list), a list of user identifiers from which digital communications will be authorized but associated source audio identifiers will not be authorized or played to the recipient (i.e., a gray list), and/or a list of user identifiers from which digital communications will be authorized and associated source audio identifiers will be authorized and played (i.e., a white list). If the digital communication processor 142 receives a digital communication and the user identifier of the sender of the digital communication is included on the black list, the digital communication is discarded and, in some implementations, an error or notification message is sent to the sender computer system 110. If the digital communication processor 142 receives a digital communication and the user identifier of the sender is included on the gray list, the digital communication is sent to the recipient computer system 120 without the corresponding source audio identifier. If the digital communication processor 142 receives a digital communication and the user identifier of the sender is included on the white list, the digital communication and the corresponding source audio identifier are sent to the recipient computer system 120.

In one implementation, once a sender is included on the white, gray, or black lists of a recipient, the sender remains on the lists irrespective of changes in the sender's source audio identifier. In another implementation, the configuration data store 146 or the data store in the recipient computer system 120 stores the source audio identifiers of the senders included on the white, gray, or black lists. When the DCHS 140 or recipient computer system 120 receives a digital communication, including a source audio identifier, the DCHS 140 or the recipient computer system 120 determines whether the sender is on one of the lists and, if the sender is on one of the lists, verifies that the attached source audio identifier is the same as the stored source audio identifier. If the attached source audio identifier is the same as the stored source audio identifier, the DCHS 140 or the recipient computer system 120 may authorize or reject the source audio identifier in accordance with the user communication exchange preferences. However, if the attached source audio identifier is different than the stored source audio identifier, the recipient computer system 120 may request that the user authorize or reject the new source audio identifier from the sender. The query may be presented in a user interface such as, for example, the user interface 300 shown in FIG. 3B.

If the user identifier of the sender of the digital communication is not included on the black, gray, or white lists, the digital communication processor 142 processes the digital communication in accordance with a default response algorithm that may be specified by the recipient and stored as part of the user communication exchange preferences of the recipient (i.e., stored in the configuration data store 146 or, additionally or alternatively, stored in the device 120A of the recipient computer system 120). For example, the recipient may choose a default response algorithm that sends the source audio identifier and the digital communication to the recipient computer system 120 if the user identifier of the sender is not on any of the lists. The recipient computer system 120 may then enable the user to perceive both the digital communication and the source audio identifier.

In another example, the recipient may choose a default response algorithm that results in the digital communication processor 142 sending a query to the recipient computer system 120 which prompts the recipient to authorize or reject the digital communication and/or the source audio identifier. The recipient computer system 120 may receive the query, which may include sender profile information accessed from the configuration data store 146, and may provide the recipient with all or a portion of this sender profile information when asking the recipient whether the recipient will authorize or reject the digital communication and/or source audio identifier. The recipient also may have the option to place the sender user identifier on the black, gray, or white lists stored as part of the user communication preferences of the recipient. The digital communication processor 142 may receive a response to the query from the recipient computer system 120 and process the digital communication accordingly. The query may, for example, be presented to the user through a visual user interface such as the user interface 300 shown in FIG. 3B.

The digital communication processor 142 typically accesses the user communication exchange preferences including one or more of the white, gray, and black lists and the default response algorithm at the beginning of a communication session between the sender and the recipient. Once the appropriate processing has been determined, subsequent digital communications sent by the sender computer system 110 are processed by the digital communication processor 142 in accordance with the already determined preferences. The digital communication processor 142 may send the source audio identifier with each subsequent digital communication from the sender; or, alternatively, the digital communication processor 142 may send the source audio identifier with the first digital communication sent at the start of the communication session. The recipient computer system 120 may then simply store the source audio identifier after receipt of the first digital communication and may access and play the stored source audio identifier for each subsequent digital communication received from the digital communication processor 142 during that communication session.

The digital communication processor 142 also may be communicatively coupled to a login system or an online presence detection system that keeps track of the login status or online presence of the user identifier corresponding to the recipient. For example, in an instant messaging context, the digital communication processor 142 may communicate with the instant messaging login system to track user identifiers that are logged in and able to receive and send instant messages. In an e-mail context, the digital communication processor 142 may communicate with an e-mail login system to track user identifiers that are logged in and able to receive and send e-mail. If a recipient of a digital communication is not logged in or otherwise online, the digital communication processor 142 may deposit the digital communication in a data store corresponding to the recipient (e.g., e-mails may be stored in the mailbox of the recipient) or may discard the digital communication (e.g., instant messages are typically discarded if the recipient is not online).

In another implementation, the digital communication processor 142 does not access user communication exchange preferences for the recipient from the configuration data store 146 and does not access a source audio identifier from the audio identifier data store 144. Instead, the digital communication processor 142 receives the source audio identifier from the sender computer system 110 with each digital communication. The digital communication processor 142, in turn, sends the digital communication with the source audio identifier to the recipient computer system 120. The recipient computer system 120 locally accesses and applies the user communication exchange preferences upon receipt of the digital communication and the source audio identifier. Based on the user communication exchange preferences, the recipient computer system 120 discards the received digital communication or enables the recipient to perceive the received digital communication. The recipient computer system 120 also either suppresses or plays the received source audio identifier with each digital communication in accordance with the user communication exchange preferences.

In another version of this implementation, the sender computer system 110 only sends the source audio identifier in the beginning of the communication session and not with each subsequent digital communication. The recipient computer system 120 stores the source audio identifier in a data store included in the device 120A and subsequently accesses and plays it with each subsequent digital communication received from the sender computer system 110 during that or subsequent communication sessions involving the sender.

The audio identifier data store 144 includes one or more data storage devices configured to store the source audio identifiers. The source audio identifiers may be stored in compressed format and/or in multiple different formats (e.g., .WAV or MP3 files) to ensure compatibility with the recipient computer system 120 and to increase speed of transmission. The source audio identifiers may be indexed by user identifier. The audio identifier data store 144 may be part of the DCHS 140. In another implementation, all or a portion of the audio identifier data store 144 may be located in a computer system or in a data storage device external to the DCHS 140.

The configuration data store 146 includes one or more data storage devices configured to store user profile information and user communication exchange preferences. The information in the configuration data store 146 is typically collected during service registration or service setup. The user profile information and user communication exchange preferences may be indexed by user identifier. The audio identifier data store 144 and the configuration data store 146 may be integrated into a single data store that stores user audio identifiers, user profile information, and user communication exchange preferences.

Figure 2:
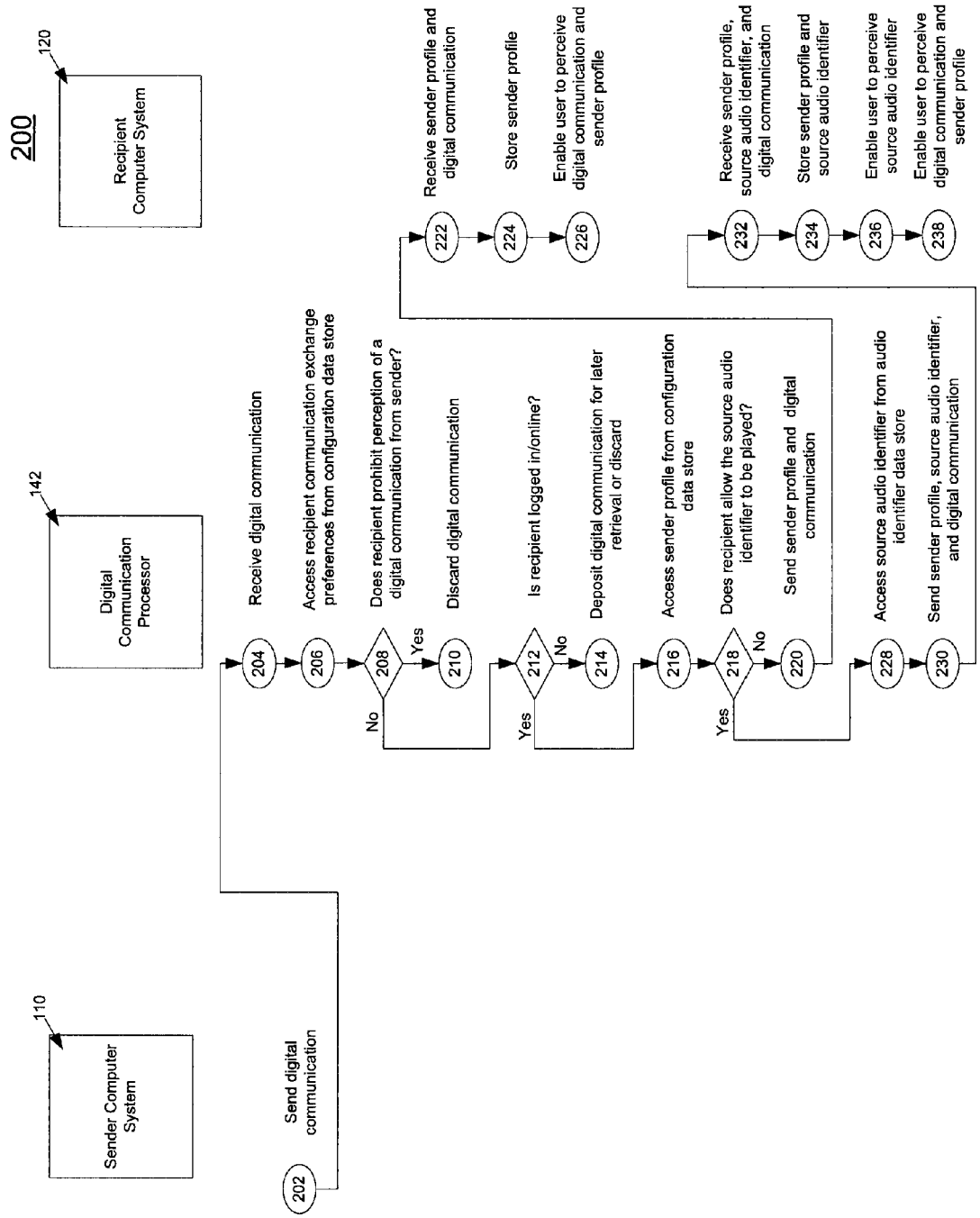
FIG. 2 is a flow chart illustrating a process for enabling presentation of a source audio identifier upon receipt of a digital communication.

FIG. 2 shows a process 200 for enabling a presentation of a source audio identifier upon receipt of a first digital communication received through a digital communication handling system (DCHS) at the beginning of a communication session between a sender computer system and a recipient computer system. For convenience, particular components described with respect to FIG. 1 are referenced as performing the process 200. However, similar methodologies may be applied in other implementations where different components are used to define the structure of the system, or where the functionality is distributed differently among the components shown by FIG. 1.

The sender computer system 110 sends a digital communication addressed to the recipient computer system 120 (202). The digital communication includes or may be associated with a sender user identifier and a recipient user identifier.

The digital communication processor 142 receives the digital communication (204) and accesses the configuration data store 146 to retrieve the user communication exchange preferences corresponding to the associated recipient user identifier (206). The digital communication processor 142 determines whether the recipient prohibits perception of digital communications from the sender by checking whether the sender user identifier is included on a black list of the recipient (208). If the recipient prohibits perception of digital communications from the sender, the digital communication is discarded (210). In some implementations, the digital communication processor 142 may additionally send a notification message to the sender computer system 110 indicating that the digital communication was not successfully sent to the recipient (not shown).

If the recipient authorizes digital communications from the sender, the digital communication processor 142 determines whether the user corresponding to the recipient user identifier is logged in or otherwise available to receive digital communications from the sender computer system 110 (212). The digital communication processor 142 may query or otherwise access a login system or a presence detection system that may be local or remote to the DCHS 140.

If the recipient is not logged in, online, or otherwise available to receive digital communications, the digital communication processor 142 may either discard the digital communication or deposit the digital communication in a data store associated with the recipient user identifier for later retrieval by the recipient (214). For example, if the digital communication is an instant message, the instant message may be discarded. On the other hand, if the digital communication is an e-mail, the e-mail may be deposited in the mailbox of the recipient. In some implementations, the digital communication processor 142 may additionally send to the sender computer system 110 a notification message indicating that the recipient is not available to receive communications and that the digital communication has been discarded or, alternatively, deposited for later retrieval.

If the recipient is logged in, online, or otherwise available to receive digital communications, the digital communication processor 142 accesses the sender profile from the configuration data store 146 (216). The digital communication processor 142 determines whether the recipient authorizes digital communications with source audio identifiers based on the recipient communication exchange preferences (218). For example, if the sender user identifier is included on the gray list of the recipient, the recipient does not authorize digital communications with source audio identifiers. If the sender user identifier is included on the white list of the recipient, the recipient authorizes digital communications with source audio identifiers. If the sender user identifier is not included on the white list or the gray list of the recipient, the recipient will authorize digital communications with source audio identifiers only if authorization is in accordance with the default response algorithm established for the recipient or if the recipient manually specifies their desire or willingness to authorize.

Figure 3A:
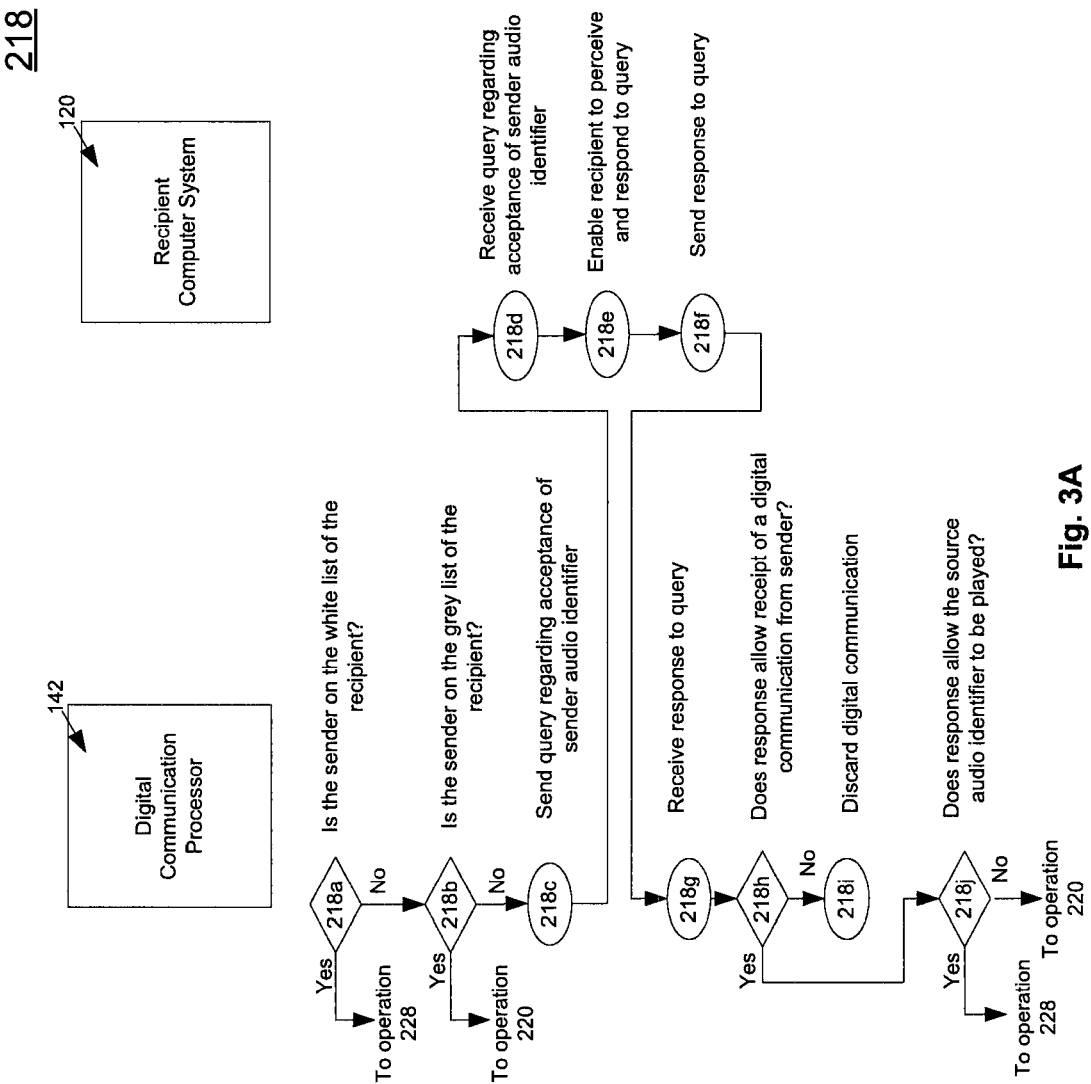
FIG. 3A is flow chart illustrating an operation of the process of FIG. 2 for sending a query to a recipient of a digital communication asking the recipient whether a source audio identifier accompanying the digital communication should be authorized or rejected.

FIG. 3A shows one implementation of operation 218 using an exemplary default response algorithm that may be used to determine whether the source audio identifier should be authorized or rejected. The digital communication processor 142 determines whether the sender is included on the white list of the recipient (218a). If the sender is included on the white list, the digital communication processor 142 proceeds to operation 228. If the sender is not included on the white list, the digital communication processor 142 determines whether the sender is included on the gray list of the recipient (218b). If the sender is included on the gray list, the digital communication processor 142 proceeds to operation 220. If the sender is not included on the white or gray lists, the digital communication processor 142 executes the default response algorithm by sending a query to the recipient computer system 120 asking the recipient whether to authorize or reject the source audio identifier (218c).

The recipient computer system 120 receives the query (218d) and enables the recipient to perceive and responds to the query (218e). For example, the recipient may perceive the query in a pop-up window that includes an option to authorize the source audio identifier and an option to reject the source audio identifier. The pop-up window may display all or a portion of the sender profile. Additionally or alternatively, the pop-up window may present options to add the sender to the white, gray, or black lists of the recipient. Once the recipient responds to the query by selecting one or more options, the recipient computer system 120 sends the response to the digital communication processor 142 (218g). An example of a user interface that may be used to query the recipient is shown in FIG. 3B.

If the selected options include adding the sender to the white, gray, or black lists of the recipient, the digital communication processor may access the configuration data store 146 and add the sender user identifier to the appropriate list or lists associated with the recipient user identifier. The digital communication processor 142 also determines whether the selected options correspond to authorization or rejection of the digital communication (218h). If the selected options reject the digital communication, the digital communication processor 142 discards the digital communication (218i). If the selected options authorize the digital communication, the digital communication processor 142 determines whether the selected options correspond to authorization or rejection of the source audio identifier (218j). If the selected options authorize the source audio identifier, the digital communication processor 142 proceeds to operation 228. If the selected options reject the sender audio identifier the digital communication processor 142 proceeds to operation 220.

Figure 3B:
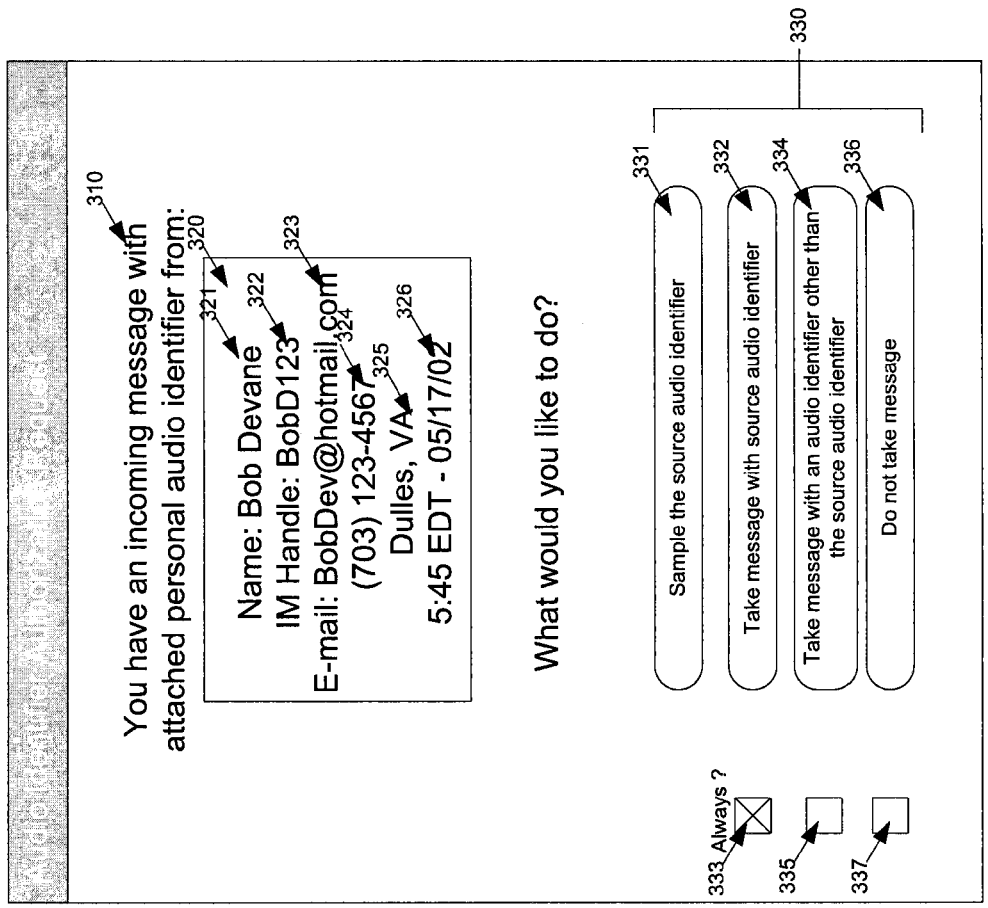
FIG. 3B is a user interface that may be presented to a user upon receipt of a digital communication with an accompanying source audio identifier.

FIG. 3B shows a user interface 300 that may be presented to the user by the recipient computer system 120 upon receipt of an incoming message with an accompanying source audio identifier. The user interface 300 includes a statement 310 informing the user of the existence of an incoming message with an accompanying source audio identifier and includes sender profile information 320. The sender profile information 320 may include the name of the sender 321 (e.g., Bob Devane), the IM handle of the sender 322 (e.g., BobD123), the e-mail address of the sender 323 (e.g., BobDev@hotmail.com), the direct number of the sender 324 (e.g., (703) 123-4567), the time and date when the message is being sent 326 (e.g., 5:45 EDT on May 17, 2002), and other sender profile information 325. The other sender profile information 325 may include, for example, the geographic location of the sender (e.g., Dulles, Va.) and information stored in an address book or calendar that is accessible based on the identity of the sender (e.g., Meeting scheduled with Bob on Saturday Jul. 12, 2003). Such information may be stored locally at the recipient computer system 120 or may be accessible from a remote device (e.g., DCHS 140) across the data network 130. In another implementation, the user interface 300 includes a subset of the sender profile information 320 displayed in FIG. 3B.

The user interface 300 also includes a set of option buttons 330 that may be selected by the user to react to the message. The option buttons 330 may include, for example, an option button to sample the source audio identifier 331, an option button to take the message and authorize the source audio identifier 332, an option button to take the message and use an audio identifier other than the source audio identifier (e.g., a default audio identifier) 334, and an option button to not take the message 336. The option buttons may be selected to control the disposition of the current message.

The user may select button 331 to hear or otherwise perceive the source audio identifier prior to deciding how to dispose of the incoming message. Hearing the source audio identifier enables the user to make a more informed decision regarding whether to authorize or reject the audio identifier. The user may then select one of the other buttons 332, 334, 336 to dispose of the message.

Selecting the option button 332 to take the message with the source audio identifier results in the digital communication and source audio identifier being perceived by the recipient. Selecting the option button 445 to take the message with a default audio identifier results in the digital communication and a default audio identifier being perceived by the recipient. In yet another implementation, upon selecting button 334, the recipient is prompted to specify an audio identifier or, alternatively, specify no audio identifier to indicate receipt of the current digital communication from the sender. The recipient-specified audio identifier may be used for future communication received from the sender if checkbox 335 is selected as discussed below. Selecting the option button to not take the message 336 results in the recipient neither perceiving the digital communication nor the source audio identifier. In another implementation, the user interface 300 includes an option button to take the message without any audio identifier being played or otherwise perceived by the recipient. The user interface 300 closes or is otherwise disabled upon the recipient selecting one of the option buttons 330.

Next to the option buttons 332, 334, and 336 are checkboxes 333, 335, and 337, respectively. Unlike the option buttons 330 which handle disposition of the current digital communication received from the sender, the checkboxes 333, 335, and 337 may be selected (i.e., "checked") to control the disposition of future digital communications received from the sender. The user interface 300 allows the user to select none or one of the three checkboxes. If the recipient selects checkbox 333, the sender user identifier is placed on the white list of the recipient upon selection of one of the option buttons 330. If the recipient selects checkbox 335, the sender user identifier is placed on the gray list of the recipient upon selection of one of the option buttons 330. If the recipient selects option 337, the sender user identifier is placed on the black list of the recipient upon selection of one of the option buttons 330. Additionally or alternatively, the user interface 300 may include checkboxes or buttons (not shown) that enable the user to specify that the source audio identifier or default audio identifier should be played only upon receipt of future communications that are at the beginning of a communication session with a sender rather than upon receipt of every future communication from the sender in a communication session.

If the recipient does not select any of the checkboxes 333, 335, or 337, any future digital communication received from the sender associated with a source audio identifier will result in displaying the user interface 300 again and once again prompting the recipient to select options regarding how the digital communication will be processed. Alternatively, the user interface 300 may be displayed only once for a given communication session, and thus, not selecting any of the checkboxes 333, 335, and 337 results in displaying the user interface 300 again only at the beginning of a future communication session with the sender.

The user interface 300 may vary depending on the capabilities of the recipient computer system 120. A recipient computer system 120 with more limited capabilities may provide less sender profile information 320 and less options 330 while recipient computer systems 120 with greater capabilities may provide more sender profile information 320 and more options 330.

Referring again to FIG. 2, if the recipient rejects the source audio identifier, the digital communication processor 142 sends or enables the recipient computer system 120 to access the sender profile and the digital communication (220). The recipient computer system 120 accesses or receives the sender profile and digital communication (222), stores the sender profile (224), and enables the recipient to perceive the digital communication and the sender profile (226). The recipient may perceive the digital communication and the sender profile through a user interface specific to the type of digital communication received. For example, if the digital communication is an instant message, the instant message may be displayed in a dialog window and the sender profile may be accessed by the user by selecting the IM handle of the sender in the dialog window or in another window displaying a list of IM handles (e.g., a buddy list) selected by or otherwise associated with the recipient. If the digital communication is an e-mail message, the e-mail header information may be displayed in an Inbox list, the e-mail contents may be displayed upon selection of the e-mail from the list, and the sender profile information may be displayed upon selection of the e-mail address of the sender.

If the recipient authorizes digital communications with source audio identifiers from the sender, the digital communication processor 142 accesses the source audio identifier corresponding to the sender user identifier from the audio identifier data store 146 (228). The digital communication processor 142 sends or enables the recipient computer system 120 to access the sender profile, the digital communication, and the source audio identifier (230).

The recipient computer system 120 accesses or receives the sender profile, source audio identifier, and digital communication (232), and stores the sender profile and source audio identifier (234). The source audio identifier and sender profile may be stored, temporarily or permanently, in a data store that is part of the recipient computer system 120 or is remote but communicatively coupled to the recipient computer system 120. In another implementation, the recipient computer system 120 renders but does not store the source audio identifier.

The recipient computer system 120 enables the recipient to perceive the source audio identifier (236) prior to or concurrent with enabling the recipient to perceive the digital communication and sender profile (238). The recipient computer system 120 may enable the recipient to perceive the source audio identifier by converting the audio identifier to audio which may be heard by the recipient. The audio is heard shortly after receipt of the digital communication and thereby informs the recipient that a digital communication has been received from that particular sender.

In another implementation of process 200, the digital communication processor 142 does not retrieve a sender profile and does not send or enable the recipient computer system 120 access to the sender profile. Instead the digital communication processor 142 sends the digital communication without a sender profile and, if applicable, with a source audio identifier to the recipient computer system 120.

Figure 4:
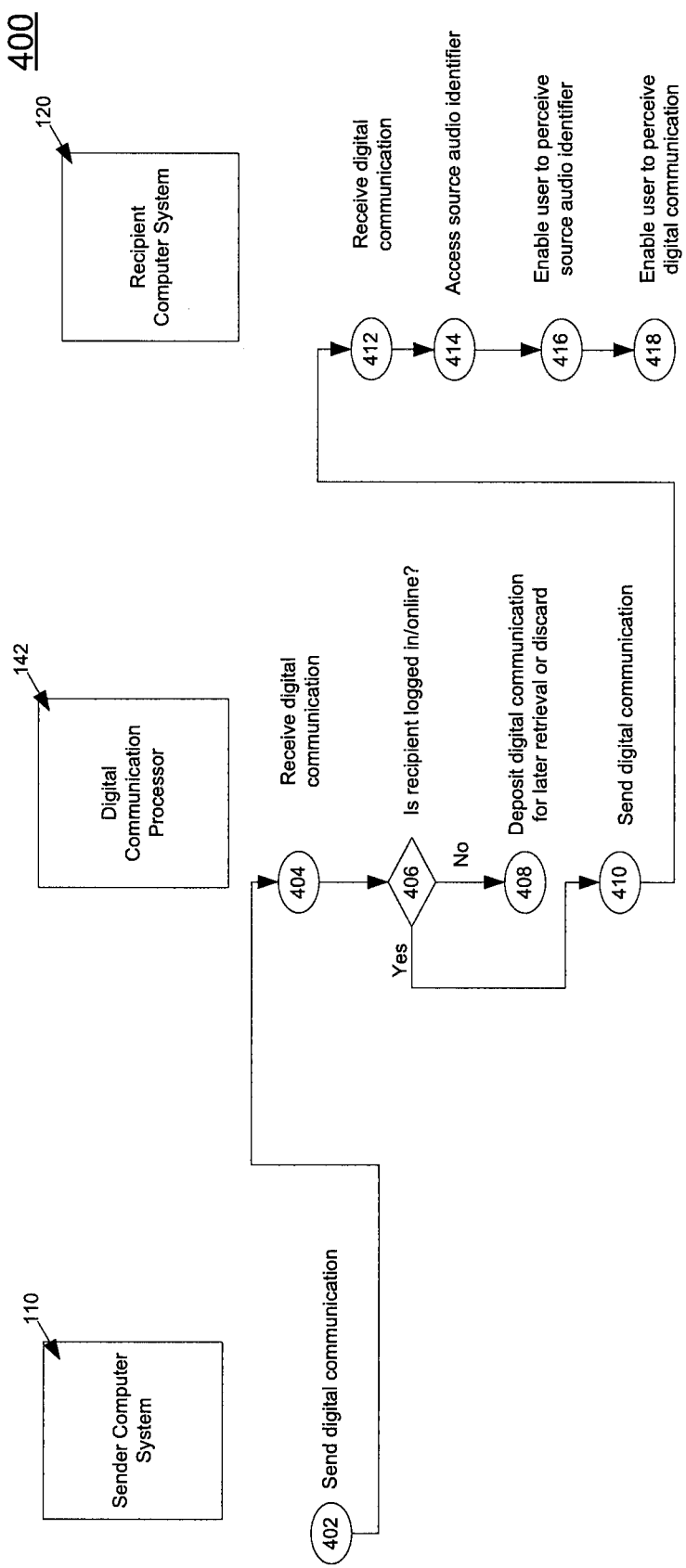
FIG. 4 is a flow chart illustrating a process for enabling presentation of a source audio identifier upon receipt of a digital communication after a communication session has already begun.

FIG. 4 shows a process 400 for enabling a presentation of a source audio identifier upon receipt of a digital communication received through a digital communication handling system after a communication session has already begun and the source audio identifier has already been stored by the recipient computer system. For convenience, particular components described with respect to FIG. 1 are referenced as performing the process 400. However, similar methodologies may be applied in other implementations where different components are used to define the structure of the system, or where the functionality is distributed differently among the components shown by FIG. 1. Process 400 is used to process the digital communications sent after sending the first digital communication in the communication session between the sender computer system 110 and the recipient computer system 120. Process 400 assumes that the recipient computer system 120 authorizes and has already stored the source audio identifier.

The sender computer system 110 sends a digital communication addressed to the recipient computer system 120 (402). The digital communication includes or may be associated with a sender user identifier and a recipient user identifier. The digital communication processor 142 receives the digital communication (404) and determines whether the user corresponding to the recipient user identifier is still logged in or is otherwise still available to receive digital communications from the sender computer system 110 (406). The digital communication processor 142 may query or otherwise access a login system or a presence detection system that may be local or remote to the DCHS 140.

If the recipient is no longer logged in, online, or otherwise available to receive digital communications, the digital communication processor 142 may either discard the digital communication or deposit the digital communication in a data store associated with the recipient user identifier for later retrieval by the recipient (408). In some implementations, the digital communication processor 142 sends a notification message to the sender computer system 110 indicating that the recipient is no longer available (not shown). If the recipient is logged in, online, or otherwise available to receive digital communications, the digital communication processor 142 sends or enables the recipient computer system 120 to access the digital communication (410).

The recipient computer system 120 receives or accesses the digital communication (412) and accesses the stored source audio identifier corresponding to the sender user identifier of the received digital communication (414). The recipient computer system 120 enables the recipient to perceive the source audio identifier (416) prior to or concurrent to enabling the recipient to perceive the digital communication (418).

Figure 5:
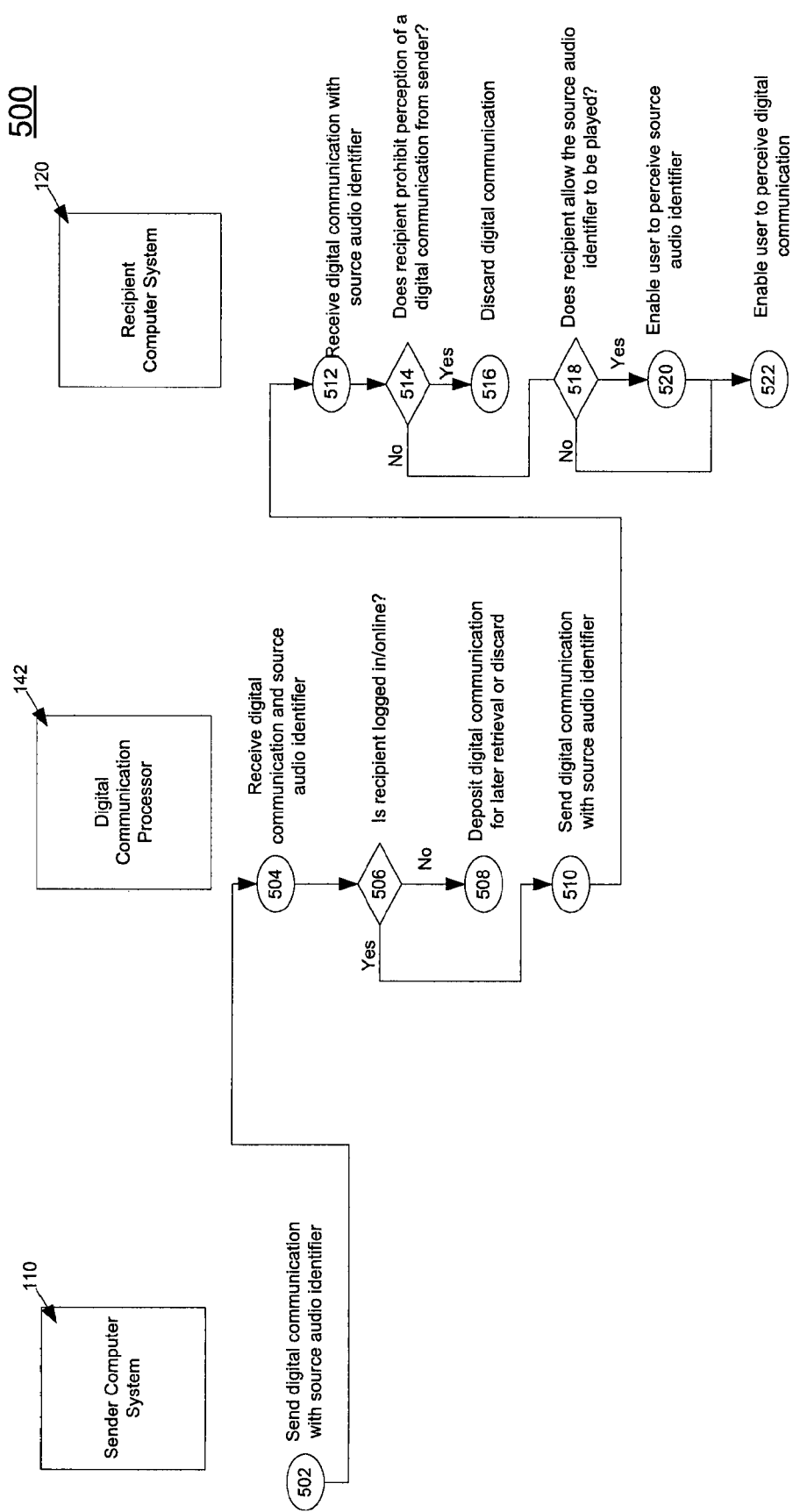
FIG. 5 is a flow chart illustrating another process for enabling presentation of a source audio identifier upon receipt of a digital communication.

Process 400 assumes that the recipient computer system 120 has already received and stored a source audio identifier corresponding to the sender of the digital communication. However, if such a source audio identifier had not been stored by the recipient computer system 120, the recipient computer system 120 may request and receive the source audio identifier from the DCP 142. The recipient computer system 120 also may request and receive a source audio identifier in an implementation in which the source audio identifier used to indicate receipt of a first communication in a communication session is different than the source audio identifier used to indicate receipt of subsequent communications in the communication session. FIG. 5 shows a process 500 for enabling a presentation of a source audio identifier upon receipt of a digital communication received through a digital communication handling system wherein the source audio identifier is stored at the sender computer system and the recipient communication exchange preferences are stored at the recipient computer system. For convenience, particular components described with respect to FIG. 5 are referenced as performing the process 500. However, similar methodologies may be applied in other implementations where different components are used to define the structure of the system, or where the functionality is distributed differently among the components shown by FIG. 1. Process 500 is different from processes 200 and 400 in that the sender computer system 110, rather than the DCHP 140, stores the source audio identifiers and the recipient computer system 110, rather than the DCHP 140, stores and applies the recipient communication exchange preferences. Process 500 minimizes the processing demands on the DCHP 140 by pushing the storage and intelligence to the sender and recipient computer systems.

The sender computer system 110 sends a digital communication addressed to the recipient computer system 120 and a source audio identifier (502). The digital communication includes or may be associated with a sender user identifier and a recipient user identifier. The digital communication processor 142 receives the digital communication and source audio identifier (504) and determines whether the user corresponding to the recipient user identifier is logged in or is otherwise available to receive digital communications from the sender computer system 110 (506). The digital communication processor 142 may query or otherwise access a login system or a presence detection system that may be local or remote to the DCHS 140.

If the recipient is not logged in, online, or otherwise available to receive digital communications, the digital communication processor 142 may either discard the digital communication or deposit the digital communication in a data store associated with the recipient user identifier for later retrieval by the recipient (508). In some implementations, the digital communication processor 142 sends a notification message to the sender computer system 110 indicating that the recipient is not available. If the recipient is logged in, online, or otherwise available to receive digital communications, the digital communication processor 142 sends or enables the recipient computer system 120 to access the digital communication and the source audio identifier (510).

The recipient computer system 120 receives or accesses the digital communication and source audio identifier (512). The recipient computer system 120 accesses the recipient communication exchange preferences and determines whether the recipient authorizes digital communications sent by the sender (i.e., determines whether the sender user identifier is included on the recipient's black list) (514). If the recipient does not authorize digital communications from the sender, the digital communication is discarded (516). In some implementations, the digital communication processor 142 may additionally send a notification message to the sender computer system 110 indicating that the digital communication was not sent to the recipient. If the recipient authorizes digital communications from the sender, the digital communication processor 142 determines whether the recipient authorizes digital communications with source audio identifiers based on the recipient communication exchange preferences (518).

Figure 6:
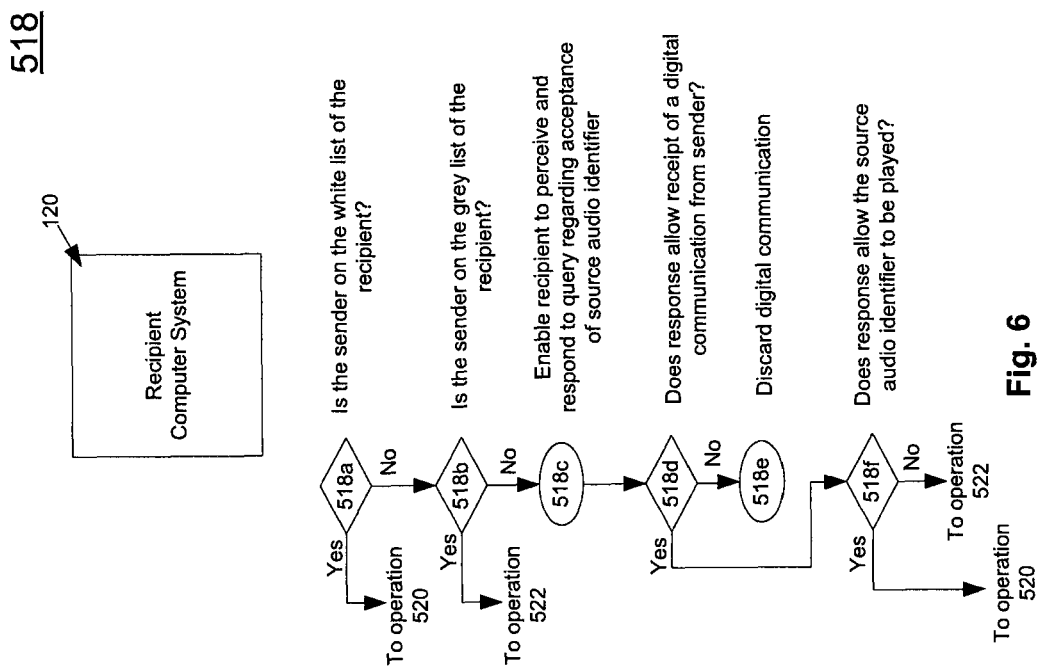
FIG. 6 is a flow chart illustrating an operation of the process of FIG. 5 for sending a query to a recipient of a digital communication asking the recipient whether a source audio identifier accompanying the digital communication should be authorized or rejected.

FIG. 6 shows one implementation of operation 518 using an exemplary default response algorithm that asks the recipient whether to authorize or reject the source audio identifier. The recipient computer system 120 determines whether the sender is included on the white list of the recipient (518a). If the sender is included on the white list, the recipient computer system 120 proceeds to operation 520. If the sender is not included on the white list, the recipient computer system 120 determines whether the sender is included on the gray list of the recipient (518b). If the sender is included on the gray list, the recipient computer system 120 proceeds to operation 522.

If the sender is not included on the white or gray lists, the recipient computer system 120 executes the default response algorithm by enabling the recipient to perceive and respond to a query asking the recipient whether to authorize or reject the source audio identifier (518c). The recipient may perceive the query (518c) in a user interface like the one shown in FIG. 3B. Once the recipient responds to the query by selecting one or more options (518c), the recipient computer system 120 determines whether the selected options correspond to authorization or rejection of the digital communication (518d). If the selected options reject the digital communication, the recipient computer system 120 discards the digital communication (518e). If selected options authorize the digital communication, the recipient computer system 120 determines whether the selected options correspond to authorization or rejection of the source audio identifier (518f). If the selected options authorize the source audio identifier, the recipient computer system 120 proceeds to operation 520. If the selected options do not authorize the source audio identifier, the recipient computer system 120 proceeds to operation 522.

Referring back to FIG. 5, if the recipient authorizes digital communications with source audio identifiers (518), the recipient computer system 120 enables the recipient to perceive the source audio identifier received with the digital communication (520) prior to or concurrent to enabling the recipient to perceive the digital communication (522). In another implementation, the recipient computer system 120 stores the source audio identifier prior to enabling the recipient to perceive the source audio identifier. If the recipient does not authorize digital communications with source audio identifiers (i.e., the sender user identifier is included on the gray list of the recipient), the recipient computer system 120 enables the recipient to perceive the digital communication (522) without enabling the recipient to perceive the received source audio identifier.

The process 500 may be performed for each digital communication sent in a communication session between the sender computer system 110 and the recipient computer system 120. Alternatively, the process 500 may be performed for the first digital communication sent in the communication session. The recipient computer system 120 may store the source audio identifier, and the sender computer system 110 may then send subsequent digital communications without the source audio identifier. The recipient computer system 120 may then process the subsequent digital communications in accordance with the determined recipient communication exchange preferences, access the stored source audio identifier, and enable the recipient to perceive the stored source audio identifier if appropriate.

In another implementation, the sender computer system 110 also sends a sender profile with the source audio identifier and the digital communication. The sender profile is received by the recipient computer system 120 along with the digital communication and source audio identifier. All or part of the sender profile may be stored and perceived by the recipient if the recipient computer system 120 determines that the recipient authorizes digital communications from the sender.

In yet another implementation, the digital communication processor 142, rather than the sender computer system 110, stores the source audio identifiers (e.g., the source audio identifiers may be stored in the audio identifier data store 144), and the recipient computer system 120 stores and applies user communication exchange preferences. In this implementation, the sender computer system 110 sends a digital communication without a source audio identifier, and the digital communication processor 142 receives the digital communication, determines whether the recipient is available to receive digital communications, and, if the recipient is available, accesses and sends a source audio identifier to the recipient computer system 120 in addition to sending the digital communication. The recipient computer system 120 receives the source audio identifier and digital communication and processes the source audio identifier and digital communication in accordance with operations 512-522.

Figure 7:
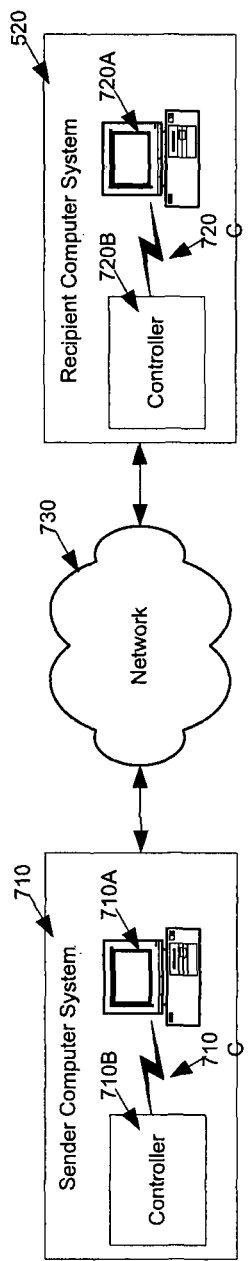
FIG. 7 is a block diagram illustrating a system for enabling exchange of digital communications with source audio identifiers over a direct connection between a sender computer system and a recipient computer system.

Referring to FIG. 7, a system 700 for enabling the exchange of digital communications with source audio identifiers includes a sender computer system 710 that sends a digital communication and source audio identifier to a recipient computer system 720 through a network 730. The sender computer system 710 and recipient computer system 720 respectively include devices 710A, 720A that communicate with controllers 710B, 720B over a data pathway 710C, 720C. Examples of each element within the communications system 700 of FIG. 7 are described broadly above with respect to FIG. 1. In particular, the sender computer system 710, the recipient computer system 720, and the network 730 typically have attributes comparable to those described above with respect to the sender computer system 110, the recipient computer system 120, and the network 130 of FIG. 1, respectively.

The sender computer system 710, however, differs from the sender computer system 110 in that the sender computer system 710 does not send digital communications to a digital communications handling system (140 in FIG. 1). Rather, the sender computer system 710 directly sends digital communications and a source audio identifier to the recipient computer system 720 through a direct connection. The direct connection may be, for example, an open socket connection (i.e., peer-to-peer socket connection) such as, for example, an open Transmission Control Protocol (TCP) connection. Both the sender computer system 710 and the recipient computer system 720 may include a Winsock Application Program Interface (API) for establishing the direct connection. In one implementation, the digital communications sent by sender computer system 710 are instant messages.

Figure 8:
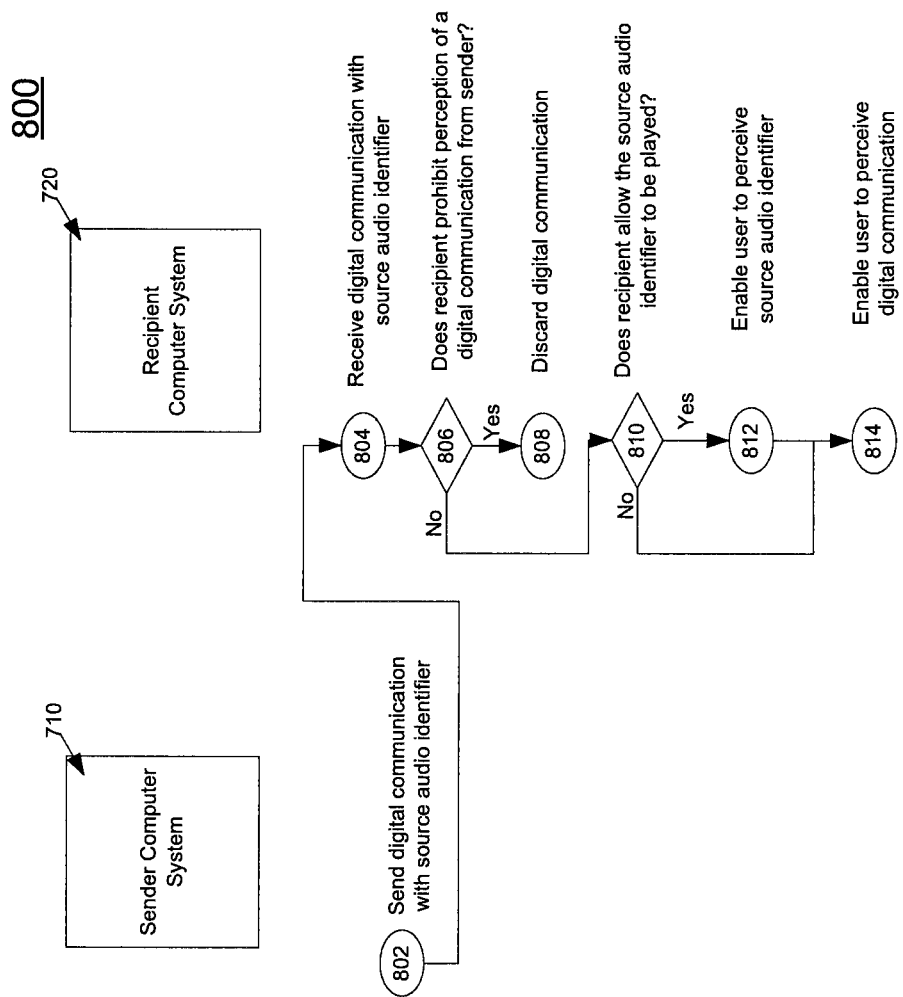
FIG. 8 is a flow chart illustrating a process for enabling a presentation of a source audio identifier upon receipt of a digital communication from a sender computer system over a direct connection.

FIG. 8 shows a process 800 for enabling a presentation of a source audio identifier upon receipt of a digital communication received from the sender computer system over a direct connection. For convenience, particular components described with respect to FIG. 7 are referenced as performing the process 800. However, similar methodologies may be applied in other implementations where different components are used to define the structure of the system, or where the functionality is distributed differently among the components shown by FIG. 7.

The sender computer system 710 sends or enables the recipient computer system 720 to access a digital communication and a source audio identifier (802). The recipient computer system 720 receives or accesses the digital communication and source audio identifier (804). The recipient computer system 720 accesses the recipient communication exchange preferences and determines whether the recipient authorizes digital communications sent by the sender (i.e., determines whether the sender user identifier is included on the recipient's black list) (806). If the recipient does not authorize digital communications from the sender, the digital communication is discarded (808). In some implementations, the recipient computer system 720 may additionally send a notification message to the sender computer system 710 indicating that the digital communication was discarded (not shown). If the recipient authorizes digital communications from the sender, the digital communication processor 142 determines whether the recipient authorizes digital communications with source audio identifiers based on the recipient communication exchange preferences (i.e., white and gray lists and the default response algorithm) (810).

If the recipient authorizes digital communications with source audio identifiers, the recipient computer system 720 enables the recipient to perceive the source audio identifier received with the digital communication (812) prior to or concurrent to enabling the recipient to perceive the digital communication (814). In another implementation, the recipient computer system 720 stores the source audio identifier prior to enabling the recipient to perceive the source audio identifier. If the recipient does not authorize digital communications with source audio identifiers (e.g., the sender user identifier is included on the gray list of the recipient), the recipient computer system 720 enables the recipient to perceive the digital communication (814) without enabling the recipient to perceive the received source audio identifier.

The process 800 may be performed for each digital communication sent in a communication session between the sender computer system 710 and the recipient computer system 720. Alternatively, the process 800 may be performed for the first digital communication sent in the communication session. The recipient computer system 720 may store the source audio identifier, and the sender computer system 710 may then send subsequent digital communications without the source audio identifier. The recipient computer system 720 may then process the subsequent digital communications in accordance with the determined recipient communication exchange preferences, access the stored source audio identifier, and enable the recipient to perceive the stored source audio identifier if appropriate.

In another implementation, the sender computer system 710 also sends a sender profile with the source audio identifier and the digital communication. The sender profile is received by the recipient computer system 720 along with the digital communication and source audio identifier. All or part of the sender profile may be stored and perceived by the recipient if the recipient computer system 720 determines that the recipient authorizes digital communications from the sender.

Figure 9:
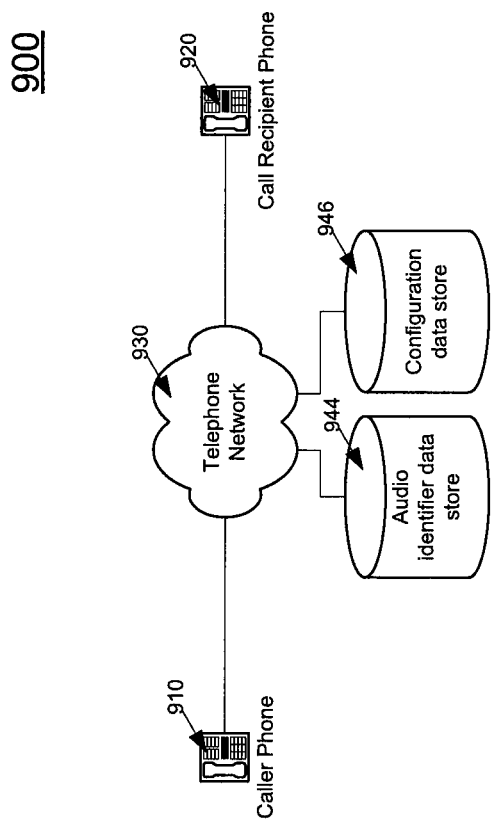
FIG. 9 is block diagram illustrating a telephone system for enabling telephone calls with source audio identifiers.
Figure 10:
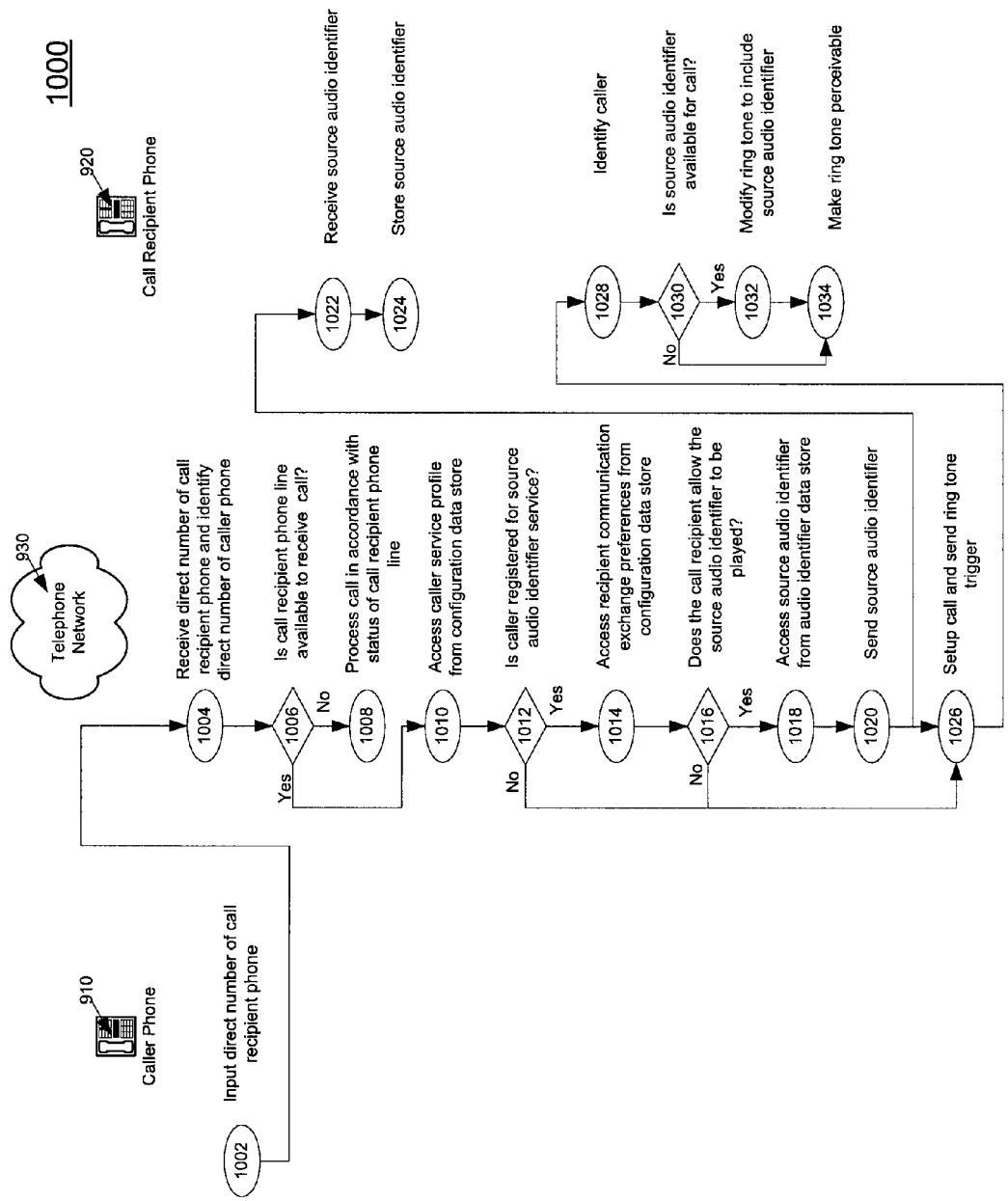
FIG. 10 is a flow chart illustrating a process for enabling a presentation of a source audio identifier as a ringing signal to indicate an incoming call from a caller.
Figure 11:
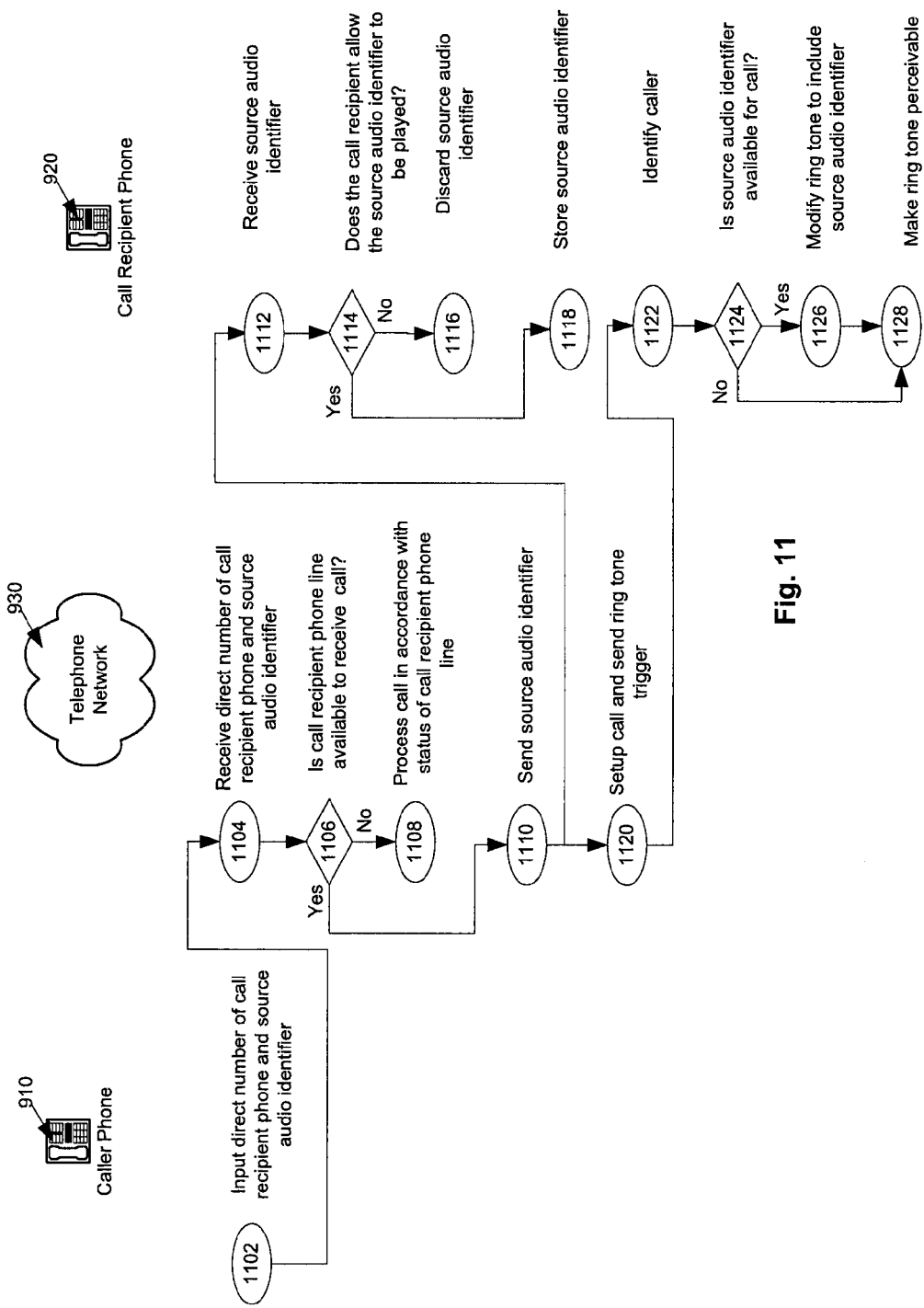
FIG. 11 is a flow chart illustrating another process for enabling a presentation of a source audio identifier as a ringing signal to indicate an incoming call from a caller.

The above systems and processes may be used for both voice and data communication contexts. FIGS. 9-11 illustrate one possible implementation of source audio identifiers used in a voice communication context.

Referring to FIG. 9, a telephone system 100 for enabling telephone calls with source audio identifiers includes a caller phone 910 that communicates with a call recipient phone 920 through a telephone network 930. The telephone network 930 may access an audio identifier data store 944 and a configuration data store 946. In some implementations, the audio identifier data store 944 and the configuration data store 946 are part of the telephone network 930.

The caller phone 910 and the call recipient phone 920 may be landline telephones that allow communications over the telephone network 930. In another implementation, the caller phone 910 and/or the call destination phone 920 may be mobile telephones or mobile personal digital assistants (PDAs) with embedded cellular phone technology.

The caller phone 910 is configured to place a call to the call recipient phone 920 across the telephone network 930. In another implementation, the caller phone 910 may additionally be configured to send a source audio identifier to the caller recipient phone 920 as part of the call setup. The caller phone 910 may send the source audio identifier as an in-band or out-of-band signal through the telephone network 930. In a cellular or mobile phone system, the caller phone 910 may, for example, send the source audio identifier as a message using Multimedia Message Service (MMS) or Short Message Service (SMS) prior to or concurrent to sending the call setup request. The MMS or SMS message typically includes the sender user identifier and may contain some or all of the sender profile. In another implementation, the caller phone 910 and the call recipient phone 920 have Internet access and the caller phone 910 may send the source audio identifier over the Internet to the call recipient phone 920.

When the source audio identifier is sent as an out-of-band signal, the caller phone 910 may receive the source audio identifier before or after receiving the ringing signal from the telephone network 930. If the caller phone 910 has received multiple source audio identifiers prior to receiving the ringing signal, the caller phone 910 identifies the appropriate source audio identifier based on the caller identity information (e.g., Automatic Number Identification (ANI) information). If the caller phone 910 has not received a source audio identifier upon receiving the ringing signal from the telephone network 930, the caller phone 910 may wait a short predetermined amount of time to receive the source audio identifier. If no source audio identifier is received after expiration of the predetermined amount of time, the caller phone 910 may use a default ringing signal.

The call recipient phone 920 is configured to receive an incoming call and a source audio identifier from the telephone network 930 and enable a recipient to perceive the incoming call and, if applicable, the source audio identifier. The call recipient phone 920 may be configured to store the source audio identifier and enable the recipient to perceive the source audio identifier as a ringing signal that indicates an incoming call from the corresponding caller. For example, the source audio identifier may be stored as a set of full music or standard ring tones. The call recipient phone 920 also may be configured to store default ringing signals that are played if the caller does not send a source audio identifier or, alternatively, if the caller sends a source audio identifier, but the call recipient does not allow the source audio identifier to be played. The default ringing signals may vary based on the direct number of the caller phone 910. In a cellular or mobile phone system, the call recipient phone 920 may, for example, receive the source audio identifier in an MMS or SMS message prior to or concurrent to receiving the incoming call. In another implementation, the call recipient phone 920 has Internet access and receives the source audio identifier over the Internet prior to or concurrent to receiving the incoming call. The call recipient phone 920 plays the source audio identifier upon receiving a ringing signal from the telephone network 930.

In yet another implementation, the call recipient phone 920 may determine whether or not to play the source audio identifier as a ringing signal and whether or not to accept the call. In this implementation, the call recipient phone 920 is configured to store user communication exchange preferences and determine whether to allow the source audio identifier to be played in accordance with the user communication exchange preferences.

The telephone network 930 is configured to enable direct or indirect voice communications between the caller phone 910 and the call destination phone 920. The telephone network 930 may include a circuit-switched voice network, a packet-switched data network, or any other network able to carry voice. For example, circuit-switched voice networks may include the Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The telephone network 930 may be configured to receive the direct number of the call recipient phone from the caller phone 910, access a configuration data store 942 to determine whether the caller has registered for source audio identifier service, access a corresponding source audio identifier, and send a call setup request and a source audio identifier, if applicable, to the call recipient phone 920. The source audio identifier may be sent as an in-band or out-of-band signal prior to or concurrent to sending the call setup request to the caller phone 910. In one implementation, the telephone network 930 is configured to process MMS or SMS messages and transmit the source audio identifier as an MMS or SMS message. In another implementation, the telephone network 930 may send the source audio identifier to the call recipient phone 920 over the Internet prior to or concurrent to setting up the call. The call recipient phone 920 plays the source audio identifier upon receiving a ringing signal from the telephone network 930 corresponding to the caller, e.g., using the ANI information associated with the caller telephone number as a means for coordinating the incoming call and the source audio identifier.

In another implementation, the telephone network 930 may be configured to receive the source audio identifier from the caller phone 910 during call setup as an in-band or out-of-band signal. For example, the telephone network 930 may be configured to receive the source audio identifier or a link to the source audio identifier as an additional component of the call destination phone number received from the caller phone 910 through a signal path.

The audio identifier data store 942 and the configuration data store 946 are described broadly above with respect to FIG. 1. In particular, the audio identifier data store 942 and the configuration data store 946 typically have attributes comparable to those described above with respect to the audio identifier data store 142 and the configuration data store 146 of FIG. 1, respectively. The audio identifier data store 942 is configured to store the source audio identifiers as, for example, standard or full music ring tones encoded as digital data and indexed by the direct number of the caller phone. The configuration data store 946 is configured to store caller service profiles which indicate the telephone services enabled on the phone line of the caller. The caller service profiles include an indication whether the caller has registered for source audio identifier service and may be indexed by direct number of the caller phone. The configuration data store 946 also may store user profiles and user communication exchange preferences. The audio identifier data store 942 and the configuration data store 946 may be integrated in a single data store.

FIG. 10 shows a process 1000 for enabling a presentation of a source audio identifier as a ringing signal to indicate an incoming call from a caller. For convenience, particular components described with respect to FIG. 9 are referenced as performing the process 1000. However, similar methodologies may be applied in other implementations where different components are used to define the structure of the system, or where the functionality is distributed differently among the components shown by FIG. 9.

The user of the caller phone 910 dials or otherwise specifies the direct number of the call recipient phone 920 (1002). The telephone network 930 receives the direct number of the call recipient phone 920 and identifies the direct number of the caller phone 910 (1004). The telephone network 930 determines whether the call recipient phone line is available to receive a call (1006). If the call recipient phone line is busy or otherwise unavailable to receive a phone call, the telephone network processes the call in accordance with the status of the call recipient phone line (e.g., by sending a busy signal to the caller phone 910) (1008).

If the call recipient phone line is available to receive a phone call, the telephone network 930 accesses the caller service profile from the configuration data store 946 (1010) and determines whether the caller is registered for source audio identifier service based on the caller service profile (1012). If the caller is not registered for source audio identifier service the telephone network 930 sets up the call and sends a ring tone trigger to the call recipient phone 920 (1026).

If the caller is registered for source audio identifier service, the telephone network 930 accesses the user communication exchange preferences corresponding to the direct number of the call recipient phone from the configuration data store 146 (1014) and determines whether the call recipient allows the source audio identifier to be played (1016). Determining whether the call recipient allows the source audio identifier to be played is accomplished in the same manner as discussed above with respect to operation 218 in FIGS. 2 and 3A, wherein the telephone network 930 performs the function of the digital communication processor 142 and the call recipient phone 920 performs the function of the recipient computer system 120. The user interface 300 also may be displayed by the call recipient phone 920 when the sender user identifier is not included on the gray, white, or black lists of the recipient. In this implementation, the message is an incoming call and a special ringing tone is used to inform the recipient of the call and inform the recipient that the caller has a source audio identifier. The call recipient may then decide whether to accept the call and whether to authorize the source audio identifier or ring tone of the caller by interacting with the user interface 300.

If the call recipient does not allow the source audio identifier to be played, the telephone network 930 sets up the call and sends a ring tone trigger to the call recipient phone 920 (1026). If the call recipient allows the source audio identifier to be played, the telephone network 930 accesses the source audio identifier corresponding to the direct number of the caller phone from the audio identifier data store 944 (1018) and sends the source audio identifier to the call recipient phone 920 (1020) prior to or concurrent to setting up the call and sending a ring tone trigger to the call recipient phone (1026).

The call recipient phone 920 receives the source audio identifier (1024) and stores the source audio identifier (1026). Once the call is setup and the call recipient phone 920 receives the ring tone trigger, the call recipient phone 920 identifies the caller typically using ANI information (1028) and determines whether a source audio identifier is available for the call (1030). If a source audio identifier is not available for the call, the call recipient phone 920 makes the ring tone perceivable by the call recipient by, for example, playing a generic or default ring tone (1034). If a source audio identifier is available for the call, the call recipient phone 920 modifies the ring tone to include the source audio identifier (e.g., by using the source audio identifier as the ring tone or by concatenating the source audio identifier with the generic or default ring tone) (1032). The call recipient phone 920 then makes the modified ring tone perceivable by the call recipient by playing the modified ring tone (1034).

FIG. 11 shows a process 1100 for enabling a presentation of a source audio identifier as a ringing signal that indicates an incoming call from a caller, wherein the caller phone sends the source audio identifier to the call recipient phone through a telephone network. For convenience, particular components described with respect to FIG. 9 are referenced as performing the process 1100. However, similar methodologies may be applied in other implementations where different components are used to define the structure of the system, or where the functionality is distributed differently among the components shown by FIG. 9.

The user of the caller phone 910 dials or otherwise specifies the direct number of the call recipient phone 920 and specifies the source audio identifier (1102). The telephone network 930 receives the direct number of the call recipient phone 920 and the source audio identifier (1104). The telephone network 930 determines whether the call recipient phone line is available to receive a call (1106). If the call recipient phone line is busy or otherwise unavailable to receive a phone call, the telephone network 130 processes the call in accordance with the status of the call recipient phone line (e.g., by sending a busy signal to the caller phone 910) (1108). If the call recipient phone line is available to receive a phone call, the telephone network 130 sends the source audio identifier to the call recipient phone 920 (1110) prior to or concurrent to setting up the call and sending a ring tone trigger to the call recipient phone 920 (1120).

The call recipient phone 920 receives the source audio identifier (1112) and determines whether the call recipient allows the source audio identifier to be played (1114). Determining whether the call recipient allows the source audio identifier to be played may be accomplished in the manner discussed above with respect to operation 518 in FIGS. 5 and 6, wherein the telephone network 930 performs the function of the digital communication processor 142 and the call recipient phone 920 performs the function of the recipient computer system 120.

If the call recipient does not allow the source audio identifier to be played, the call recipient phone 920 discards the source audio identifier (1116). If the call recipient allows the source audio identifier to be played, the call recipient phone 920 stores the source audio identifier (1118).

Once the call is setup and the call recipient phone 920 receives the ring tone trigger, the call recipient phone 920 identifies the caller typically using ANI information (1122) and determines whether a source audio identifier is available for the call (1124). If a source audio identifier is not available for the call, the call recipient phone 920 makes the ring tone perceivable by the call recipient by, for example, playing a generic or default ring tone (1128). If a source audio identifier is available for the call, the call recipient phone 920 modifies the ring tone to include the source audio identifier (e.g., by using the source audio identifier as the ring tone or by concatenating the source audio identifier with the generic or default ring tone) (1126). The call recipient phone 920 then makes the modified ring tone perceivable by the call recipient by playing the modified ring tone (1128).

In yet another implementation, the telephone network 930, rather than the caller phone 910, stores the source audio identifiers (e.g., the source audio identifiers may be stored in the audio identifier data store 144), and the call recipient phone 920 stores and applies user communication exchange preferences. In this implementation, the caller phone 910 sends a digital communication without a source audio identifier, and the telephone network 930 receives the digital communication, determines whether the recipient phone line is available to receive an incoming call, and, if the recipient phone line is available, accesses and sends a source audio identifier to the call recipient phone 920 in addition to setting up the call. The call recipient phone 920 receives the source audio identifier and processes the source audio identifier in accordance with operations 1112-1128.

Figure 12:
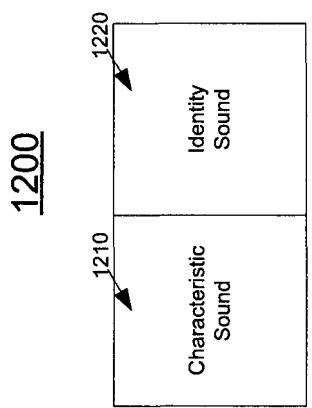
FIGS. 12-15 are block diagrams illustrating exemplary concatenated audio messages.

The source audio identifier may be a single sound that identifies the sender or, alternatively, may be a concatenated audio message formed from multiple sounds that are concatenated together to identify one or more characteristics of the sender or of the communication in addition, or as an alternative to the sender identity. As shown in FIG. 12, in one possible implementation, the concatenated audio message 1200 includes a first sound 1210 signifying a characteristic or trait of the sender or communication followed by a second sound 1220 that identifies the individual sender (e.g., the spoken version of the sender's name). The identity sounds are chosen to identify the individual sender while the characteristic sounds are chosen to describe, qualify, or characterize the sender. Characteristic sounds may include, but are not limited to, a sound that identifies the location from which the sender is calling/sending (e.g. from California, home, work, or school), a job group to which the sender belongs (e.g., a doctor, a lawyer, an electrician, a mechanic, or a plumber), an organization to which the member belongs or works (e.g., the Porsche Club of America, the National Rifle Association, the Rotary Club, Ford Motor Company, Microsoft, and Cooper Power Systems), other group membership by the sender (e.g., buddy group in a recipient's instant message buddy list or category in the recipient's content list), the urgency or importance of the digital communication or call (e.g., a low-pitched sound may indicate that the call is not urgent while a high-pitched sound may indicate that the call is very urgent), the type of call or digital communication (e.g., a social call, a business call, an e-mail, an instant message, a call wishing the recipient a happy birthday, or a call wishing the recipient a happy anniversary), the type of communication device used to send the digital communication (e.g., a desktop personal computer, a pager, a PDA, or a mobile phone), the online status of the sender (e.g., online or offline), the availability to receive communications over different communication devices including a cell phone, PDA, or desktop computer, the availability to receive different types of communications (e-mails, phone calls, IMs)), the number of degrees of separation between the senders and recipient, or the satisfaction or dissatisfaction of a degrees separation threshold by sender.

The concatenated audio message may be formed of any combination of identity and/or characteristic sounds. For example, a concatenated audio message may be formed solely of identity sounds or, alternatively, may be formed solely of characteristic sounds.

Figure 13:
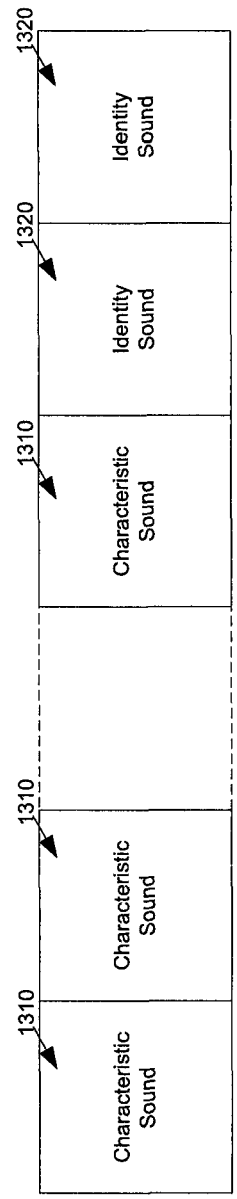

Referring to FIG. 13, the concatenated audio message 1300 may provide multiple levels of information regarding the sender/caller or the communication sent by the sender by concatenating multiple different characteristic sounds 1310 and identity sounds 1320. FIG. 13 shows the characteristic sounds 1310 concatenated at the beginning of the concatenated audio message 1300 and the identity sounds 1320 concatenated at the end of the concatenated audio message 1300. However, any order of concatenation is possible. As more sounds are concatenated, the sender is able to provide the call recipient with increasing levels of information. When the concatenated audio message is used as a ring tone, the concatenated sounds may be played multiple times in succession until the recipient answers the phone or the call is otherwise disposed of.

The length of each concatenated sound within the concatenated audio message may be specified by the sender. The sender computer system 110, 510 or the caller phone 910 may enable the sender to limit the length and number of concatenated sounds that may be sent. Additionally or alternatively, the digital communication processor 142 or the telephone network 930 may limit the total length of the concatenated audio message or the total number and length of each particular concatenated sound in the concatenated audio message.

The length of each concatenated sound within the concatenated audio message also may be specified by the recipient. The concatenated audio message may be encoded such that the recipient computer system 120, 520 or the call recipient phone 920 recognizes and distinguishes between each concatenated sound. The recipient computer system 120, 520 or the call recipient phone 920 may enable the recipient to control whether each concatenated sound is played and the length of each concatenated sound. The recipient may control the playback of each concatenated sound while the concatenated sounds are playing (e.g., may select a function on the call recipient phone 920 or the recipient computer system 120, 520 to skip to the next concatenated sound), or, additionally or alternatively, the recipient may setup user communication exchange preferences that specify the length, number, and type of concatenated sounds that are played upon receipt of a concatenated audio message.

In another implementation, the digital communication processor 142 or the telephone network 920 processes the concatenated audio message in accordance with the user communication exchange preferences of the recipient prior to sending the concatenated audio message to the recipient computer system 120, 520 or to the call recipient phone 920. In yet another implementation, the length of the concatenated audio message that is played is a default or a preselected value and is not specified by the recipient or the sender. The length also may be varied on a per-group or a per-user basis.

The concatenated audio message also may be concatenated with one or more recipient-specified sounds. The recipient-specified sounds may be characteristic sounds or identity sounds. For example, the recipient may select or define a characteristic sound that indicates that the sender is a member of the buddy list of the recipient. When a recipient receives an Instant Message from a sender listed in the buddy list of the recipient, a concatenated audio message may be formed by concatenating a recipient-specified buddy list characteristic sound to the end of the sender-specified sound(s). By listening to the concatenated audio message, the recipient is able to both identify the sender and determine that the sender is a member of the buddy list of the recipient. The characteristic sound may be modified to indicate that the sender belongs to the co-worker or family groups in the buddy list of the recipient or, alternatively, to indicate that the sender belongs to any arbitrary group defined by the recipient, by the recipient computer system 120, 520, or by the call recipient phone 920.

The recipient also may specify identity sounds. For example, a recipient may specify an identity sound saying "DaBigBoss!" to indicate receipt of a communication from the recipient's boss. If the boss has chosen a sender-specified identity sound saying "John", the recipient hears "DaBigBoss! John" upon receipt of a digital communication or a call from the boss.

Figure 14:
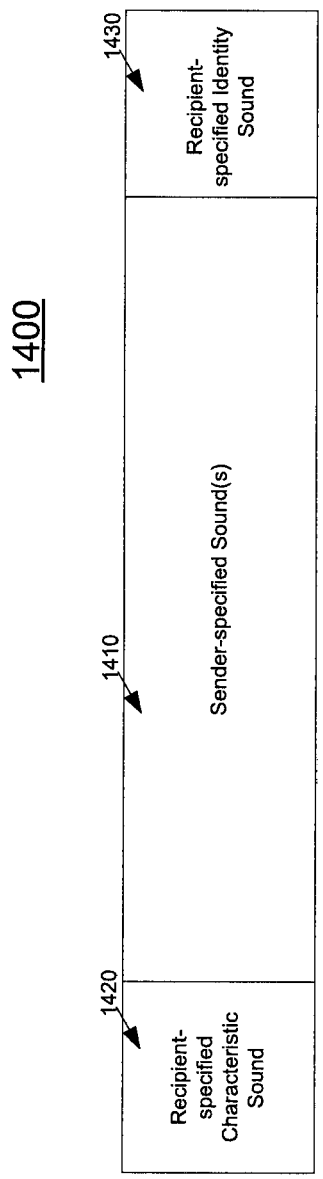
Figure 15A:
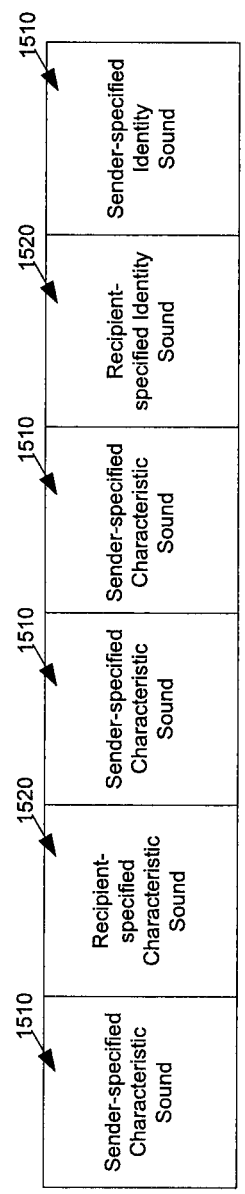

FIG. 14 shows a concatenated audio message 1400 that includes sender-specified sounds 1410 concatenated with one or more recipient-specified characteristic sounds 1420 and one or more recipient-specified identity sounds 1430. FIG. 15A shows another example of a concatenated audio message 1500 formed by mixing and concatenating sender-specified sounds 1510 and recipient-specified sounds 1520. The order in which the sounds are concatenated may be varied. For example, the sounds specified by the recipient may appear first, followed by the sounds specified by the sender.

In another implementation, all or some of the sounds in the concatenated audio message are not specified by the recipient or by the sender but rather are more globally defined. For example, the sounds may be defined by the DCHS 140, by the telephone network 930, or by another system communicatively coupled to the recipient computer system 120, 520 or to the call recipient phone 920.

Figure 16:
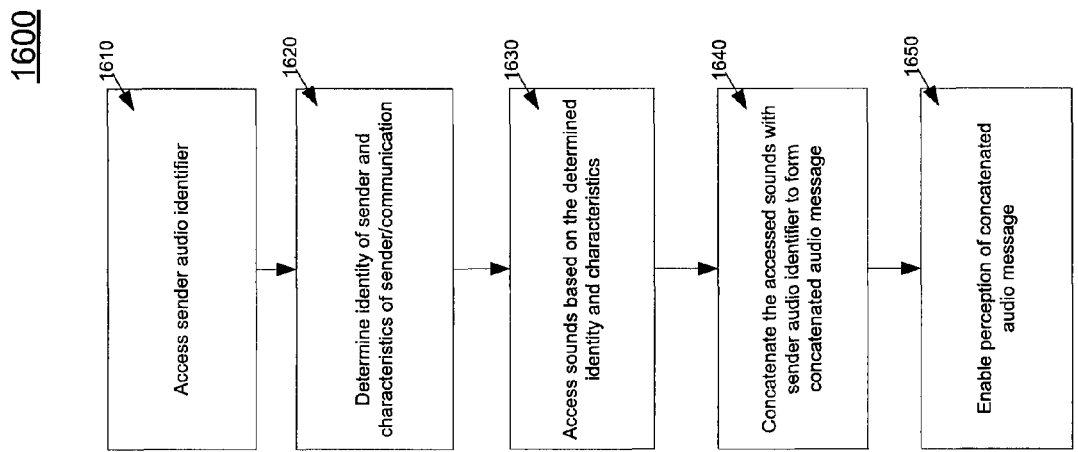
FIG. 16 is a flow chart illustrating a process for creating and enabling perception of a concatenated audio message that includes recipient-specified sounds.

FIG. 16 shows a process 1600 for creating and enabling perception of a concatenated audio message that includes recipient-specified sounds. Process 1600 may be performed by the recipient computer system 120, 520 or by the call recipient phone 920. Additionally or alternatively, process 1600 may be performed by the digital communication processor 142 or by the telephone network 930.

A source audio identifier is received or accessed (1610). The accessing of the source audio identifier may correspond to operation 228 of process 200, operation 512 of process 500, operation 804 of process 800, operation 1018 of process 1000, or operation 1104 of process 1100. The identity of the sender and characteristics of the sender or communication are determined (1620). The identity of the sender may be determined from the sender user identifier of the digital communication, the direct number of the call, or from sender identity information included or received with the source audio identifier. The recipient computer system 120, 520, the call recipient phone 920, the digital communication processor 142, or the telephone network 930 may determine the identity or characteristics of the caller/sender or communication by accessing the configuration data store 144, 944 or by accessing one or more local or remote data stores or computer systems (including messaging systems) that store or are able to access and provide identity and characteristics information regarding the caller or the communication. For example, the call recipient phone 920 or the recipient computer system 120, 520 may access local storage to determine that the caller/sender is in the address book of the recipient and is designated as a coworker in that address book. Additionally or alternatively, the call recipient phone 920 or the recipient computer system 120, 520 may access an instant messaging system to determine that the recipient is online and available to receive instant messages.

Identity and characteristic sounds may be accessed based on the determined identity and characteristics (1630). The identity and characteristic sounds are specified by the recipient and may be stored in the audio identifier data store 144, 944 or in a data storage included with or accessible to the recipient computer system 120, 520, the call recipient phone 920, the digital communication processor 142, or the telephone network 930. The accessed sounds are concatenated together with the source audio identifier to form a concatenated audio message with recipient-specified sounds (1640). For example, the call recipient phone 920 or the recipient computer system 120, 520 may access a characteristic sound corresponding to one second of a somber funeral march to indicate that the sender/caller is a coworker and may access a second characteristic sound corresponding to a high-pitched bell sound that indicates that the sender/caller is online and available to receive instant messages. Referring to FIG. 15B, if the source audio identifier corresponds to the sound of a rooster, the concatenated audio message 1520 corresponds to one second of a somber funeral march followed by the sound of a rooster which is, in turn, followed by a high-pitched bell sound.

Operations 1620-1640 may occur, for example, after operation 228 and before operation 230 of process 200; after operation 518 and before operation 520 of process 500; after operation 810 and before operation 812 of process 800; after operation 1018 and before operation 1020 of process 1000; or after operation 1116 and before operation 1120 of process 1100.

Once the concatenated audio message with recipient-specified sounds is formed, the recipient is enabled to perceive the concatenated audio message (1650). Operation 1650 corresponds to operations 230-236 of process 200, operation 520 of process 500, operation 812 of process 800, operations 1020 and 1024-1028 of operation 1000, and operations 1120 and 1122 of process 1100, wherein the source audio identifier is now the concatenated audio message in the above operations.

Concatenated audio messages may be used in communications systems that do not use sender-specified sounds. In this implementation, the recipient computer system 120, 520, the call recipient phone 920, the telephone network 930, or the digital communication processor 142 receives or otherwise accesses a call or digital communication from a sender rather than accessing a source audio identifier as specified by operation 1610. Operations 1620-1650 are then performed to generate and enable perception of a concatenated audio message. The concatenated audio message, however, does not include a source audio identifier.

Concatenated audio messages also may be used to audibly inform a user of communication-related events that are not related to the receipt of a communication. For example, concatenated audio messages may be used in an instant messaging context to audibly inform a user of presence state changes of a member of the buddy list of the user (i.e., a "buddy"). For instance, the typical door opening/door closing sound that is played to a user when a buddy signs on or off is an event identity sound and may be concatenated with an event characteristic sound indicating precisely which buddy is signing on or off or that a buddy within a particular-buddy category or having a particular characteristic is signing on or off. Furthermore, another event characteristic sound indicating that the user is a member of the family or co-workers subgroups of the buddy list of the user also may be concatenated to the door opening/door closing sound to further audibly classify the user signing on or off.

Figure 17:
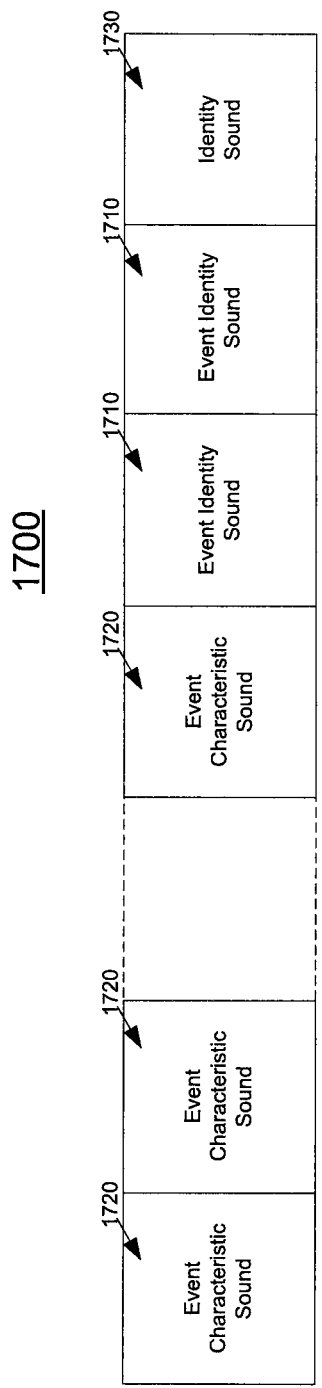
FIG. 17 is a block diagram illustrating an exemplary concatenated audio message used to inform a user of the occurrence of an event.

FIG. 17 shows a concatenated audio message for an event 1700. The concatenated audio message for an event 1700 may include any combination of event identity sounds 1710 and event characteristic sounds 1720. The event identity sounds 1710 identifies the specific event and are typically unique to that event. The event characteristic sounds 1720 further describe, qualify, and classify the event and are typically applicable to multiple different events. The concatenated audio message for an event 1700 also may optionally include any combination of user identity sounds 1730 and/or characteristic sounds (not shown).

Figure 18:
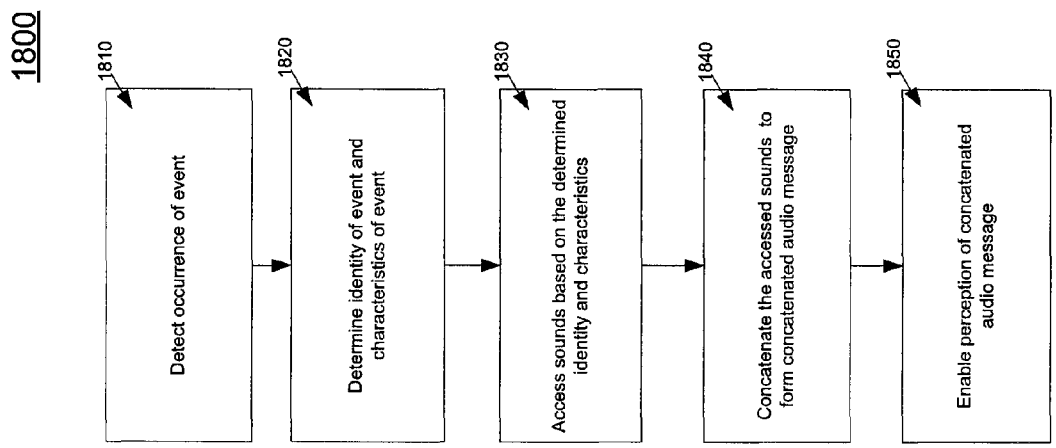
FIG. 18 is a flow chart illustrating a process for creating and enabling perception of a concatenated audio message upon detection of the occurrence of an event.

FIG. 18 shows a process 1800 for creating and enabling perception of a concatenated audio message upon detection of the occurrence of an event. Process 1800 may be performed by the recipient computer system 120, 520 or by the call recipient phone 920. Additionally or alternatively, process 1800 may be performed by the digital communication processor 142 or by the telephone network 930.

The occurrence of an event is detected (1810). The identity of the event and characteristics of the event are determined (1620). The identity of the event is typically tracked by the application that generates the event and may be identified through interactions with that application. Characteristics of that event also may be tracked by that application and determined either through interactions with that application or by accessing data storage devices or systems communicatively coupled to the recipient computer system 120, 520, the call recipient phone 920, the digital communication processor 142, or the telephone network 930.

The event identity and event characteristic sounds may be accessed based on the determined identity and characteristics of the event (1830). The event identity and event characteristic sounds may be stored in the audio identifier data store 144, 944 or in a data storage included with or accessible to the recipient computer system 120, 520, the call recipient phone 920, the digital communication processor 142, or the telephone network 930. The accessed sounds are concatenated together to form a concatenated audio message (1840). Once the concatenated audio message is formed, the user is enabled to perceive the concatenated audio message (1650). The call recipient phone 920 or the recipient computer system 120, 520 typically plays the concatenated audio message upon occurrence of the event and, thereby, enables the user to hear the concatenated audio message and identify the event and its characteristics.

In a more general implementation, concatenated audio messages may be used in any applications, not just communication-related applications, which inform users of the occurrence of events wherein the events may be described as belonging to multiple associated, nested, or hierarchical classes. The concatenated audio message may include an event identity sound that identifies the event and one or more event characteristic sounds that indicate the classes and subclasses in which the event is categorized.

A number of implementations have been described. Nevertheless, it will be understood that various modifications may be made. For example, the source audio identifier may be a video identifier, rather than an audio identifier, and may be perceived by the recipient each time a digital communication or call is received from the sender. Additionally or alternatively, the sender identifier may be an audiovisual presentation or any other non-textual form of identifier that may be perceived by the recipient as an indicator of the identity of the sender. The source audio identifier may be larger than 2 megabits in size or smaller than 120 kilobits in size. The source audio identifier, when converted to audio, may produce more than 2 seconds of sound or less than one second of sound.

The following is a list of additional implementations. One or a combination of the following implementations may be used to add various functions or features.

In a first implementation, the digital communication processor 142, the telephone network 930, the sender computer system 110, 520, or the caller phone 910 may communicate with the recipient computer system to determine whether the recipient computer system 120, 520 has already stored the source audio identifier prior to sending a source audio identifier. If the recipient computer system 120, 520 has already stored a source audio identifier for the sender, no source audio identifier may be sent by the digital communication processor 142, by the telephone network 930, by the sender computer system 110, 510, or by the caller phone 910.

In a second implementation, the default response algorithm of FIG. 3A and FIG. 6 and may include an option to store the digital communication for later retrieval. If this option is selected, the digital communication is stored in a data store corresponding to the recipient (e.g., an e-mail inbox) and may be accessed by the recipient at a later date. The user interface 300 of FIG. 3B also may include an option button and a check box that may be selected to store the current digital communication and all future digital communications from that sender, respectively, for later retrieval.

In a third implementation, the digital communication processor 142 may not send the complete digital communication to the recipient computer system 120, upon receipt of that digital communication from the sender computer system 110. Instead, the digital communication processor 142 may store the digital communication and send a portion of the digital communication to the recipient computer system 120 with or without the source audio identifier. The recipient may perceive the source audio identifier upon receiving the portion of the digital communication from the digital communication processor 142. The recipient perceives the portion of the digital communication and determines whether he or she wants to perceive the complete digital communication based on the perceived portion. The recipient may then choose to perceive the complete digital communication, and the recipient computer system 120 enables the recipient to access the complete digital communication from the appropriate data store. For example, in an e-mail oriented context, the digital communication processor 142 may receive an e-mail addressed to the recipient, may store the e-mail in the inbox corresponding to the recipient, and may send header information (e.g., sender e-mail address, time and date sent, subject of e-mail, and recipients of e-mail) and, if applicable, the source audio identifier to the recipient computer system 120. The recipient computer system 120 may play the source audio identifier upon receipt of the header information and may include all or some of the header information of the received e-mail in the inbox list displayed to the recipient. The recipient may then select the header information for that e-mail and the recipient computer system 120 then enables the recipient to access and perceive the complete e-mail stored in the inbox of the recipient.

In a fourth implementation, if the received digital communication is an e-mail, the concatenated audio message may include an identity or characteristic sound that corresponds to the "true source" of an e-mail that has been forwarded, or that corresponds to the identities listed in the "cc" or "bcc" fields of the e-mail header. The identity or characteristic sound may be an alternative to or an addition to an identity sound corresponding to the identity listed in the "from" field of the e-mail header (i.e., the direct source of the e-mail). Additionally, the digital communication processor 142 or the recipient computer system 120 may automatically bypass the concatenated audio message in situations where the recipient is merely listed in the "cc" or "bcc" fields of the e-mail header. The volume of the identity or characteristic sounds also may be varied to signify different levels of importance of the recipient or e-mail. For example, if the recipient is listed in the "to" field of the e-mail address header, the volume may be set to the highest level while if the recipient is listed in the "bcc" field, the volume may be set to the lowest level. If the e-mail is designated as "urgent" by the sender, the volume also may be set to its highest level.

In a fifth implementation, the DCHS 140 or telephone network 930 may track the source audio identifiers that have been sent to and stored by the recipient computer system 120 or by the call recipient phone 920. If the DCHS 140 or telephone network 930 determines that the source audio identifier has already been locally stored by the recipient computer system 120 or by the call recipient phone 920, the DCHS 140 or the telephone network 920 may not send the source audio identifier to the recipient computer system 120 or to the call recipient phone 920. The recipient computer system 120 or the call recipient phone 920 may access and play the source audio identifier based on the sender user identifier of the incoming call or received digital communication.

In a sixth implementation, the digital communication processor 142, the telephone network 930, the sender computer system 110, 510, or the caller phone 910 may send to the recipient computer system 120, 520 or to the call recipient phone 920 a link to the source audio identifier rather than sending the source audio identifier itself. The recipient computer system 120, 520 or the call recipient phone 920 may use the link to access the source audio identifier. The link may be, for example, a Universal Resource Locator (URL) that specifies a web site storage location where the source audio identifier is stored.

In a seventh implementation, the digital communication processor 142 may determine whether the sender has an associated source audio identifier upon receipt of a digital communication prior to accessing or applying recipient communication exchange preferences. If the sender or caller has an associated source audio identifier, the digital communication processor 142 may proceed as in operations 206-238 of process 200. If no source audio identifier is associated with the sender, the digital communication processor 142 may handle the digital communication or call in the same manner as an ordinary digital communication is handled. The digital communication processor 142 may access the audio identifier data store 144 based on the sender user identifier to initially determine whether the sender has an associated source audio identifier. If no source audio identifier corresponding to the sender user identifier is stored in the audio identifier data store 144, then the sender is deemed to not have an associated source audio identifier.

In an eighth implementation, the digital communication processor 142 or the recipient computer system 120 may always query the recipient regarding how to deal with a heretofore unknown source audio identifier. The recipient may select from among various audio identifier control options like the ones described with respect to FIG. 3B to determine how to handle the received message with source audio identifier and how to handle future messages with source audio identifiers received from the same source.

In a ninth implementation, the user communication exchange preferences may be stored and consulted/invoked locally or remote to the sender computer system 120 or to an intermediary computer system (e.g., the digital communication processor 142) in each of the processes and systems described with respect to FIGS. 2, 3A, 4, 5, and 6.

In a tenth implementation, the user interface 300 may include additional control options that provide a recipient with greater control over audio identifiers. For example, the user interface 300 may include an option that enables the source audio identifier to be presented upon receipt of a first digital communication from the source in a communication session between the source and the recipient and enables a second audio identifier to be presented upon receipt of each of the other digital communications received from the source during that communication session. The second audio identifier is different than the first audio identifier and may be designated by the recipient or by the sender. Alternatively, the second audio identifier may be a generic audio identifier not designated by either the recipient or by the sender. The user interface 300 also may include an option that enables the second audio identifier to be presented upon receipt of a first digital communication in the communication session and enables the source audio identifier to be presented upon receipt of each of the other digital communications received from the source during that communication session. The user interface 300 also may include an option that the source audio identifier or the second audio identifier is presented upon receipt of a first digital communication in the communication session and no audio identifier is presented upon receipt of each of the other digital communications received from the source during that communication session.

What is claimed is:

1. A method comprising:
    receiving a first communication directed to a first user from a second user;
    identifying an audio identifier associated with the first communication;
    providing, in conjunction with the first communication, a user interface to the first user, the user interface comprising profile information of the second user;
    providing, by way of the user interface, one or more options comprising an option to associate a different audio identifier with communications from the second user;
    receiving, from the first user, a selection of the option to associate a different audio identifier with communications from the second user;
    receiving a second communication from the second user directed to the first user;
    and
    rendering, in conjunction with the second communication and based on the selection of the option to associate the different audio identifier with communications from the second user, the different audio identifier so as to be made perceivable as a ring tone for the second communication.

2. The method of claim 1, further comprising enabling, by way of the user interface, the first user to sample one or more example audio identifiers.

3. The method of claim 2, wherein enabling the first user to sample the one or more example audio identifiers comprises enabling perception of at least a portion of the one or more example audio identifiers.

4. The method of claim 1, wherein the audio identifier is a default audio identifier.

5. The method of claim 1, wherein providing, by way of the user interface, the one or more options comprises presenting an option to associate a group audio identifier that identifies a group of users, the group of users comprising the second user.

6. The method of claim 1, wherein providing, by way of the user interface, the one or more options comprises presenting an option to associate the different audio identifier with a type of communication received from the second user.

7. The method of claim 6, wherein the type of communication comprises a phone call, a text message or an instant message.

8. The method of claim 7, further comprising associating phone calls from the second user with a first audio identifier and associating text messages from the second user with a second audio identifier.

9. The method of claim 1, wherein providing, by way of the user interface, the one or more options comprises presenting a selectable check box to the first user.

10. The method of claim 9, wherein receiving, from the first user, a selection of the option to associate a different audio identifier with communications from the first user comprises detecting the selection of the selectable check box.

11. The method of claim 1, wherein providing, by way of the user interface, one or more options further comprises providing an option to associate each of a plurality of types of communications received from the second user with different audio identifiers.

12. The method of claim 1, wherein providing, by way of the user interface, one or more options further comprises providing an option to specify that the different audio identifier be perceived only once at the beginning of a communication session.

13. A mobile device comprising:
    at least one processor, and
    a non-transitory computer readable medium storing instructions that, when executed by the at least one processor, cause the at least one processor to:
        receive a first communication directed to a first user from a second user;
        identify an audio identifier associated with the first communication;
        provide, in conjunction with the first communication, a user interface to the first user, the user interface comprising profile information of the second user;
        provide, by way of the user interface, one or more options comprising an option to associate a different audio identifier with communications from the second user;
        receive, from the first user, a selection of the option to associate a different audio identifier with communications from the second user;
        receive a second communication from the second user; and
        render, in conjunction with the second communication and based on the selection of the option to associate the different audio identifier with communications from the second user, the different audio identifier so as to be made perceivable as a ring tone for the second communication.

14. The mobile device of claim 13, wherein the profile information of the second user comprises a name of the second user, an instant message handle of the second user, an email address of the second user, or a direct number of the second user.

15. The mobile device of claim 13, wherein the profile information is locally stored on the mobile device.

16. The mobile device of claim 13, wherein the profile information is remotely stored and accessed across a data network.

17. The mobile device of claim 13, wherein providing, by way of the user interface, one or more options comprises presenting an option button to a pre-defined user list audio identifier that identifies a group of users.

18. The method of claim 14, wherein providing, by way of the user interface, one or more options comprises presenting a selectable check box to the first user.

19. The method of claim 11, wherein providing an option to associate each of the plurality of types of communications comprises presenting a selectable check box to the first user.

* * * * *